(12) United States Patent
Kanna et al.

(10) Patent No.: US 9,984,335 B2
(45) Date of Patent: May 29, 2018

(54) DATA PROCESSING DEVICE

(71) Applicant: NEC Corporation, Minato-ku, Tokyo (JP)

(72) Inventors: Yoshihiro Kanna, Tokyo (JP); Nobutatsu Nakamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 528 days.

(21) Appl. No.: 14/615,605

(22) Filed: Feb. 6, 2015

(65) Prior Publication Data
US 2015/0227852 A1 Aug. 13, 2015

(30) Foreign Application Priority Data

Feb. 7, 2014 (JP) ................................. 2014-022045

(51) Int. Cl.
G06F 17/00 (2006.01)
G06F 17/20 (2006.01)
G06N 99/00 (2010.01)
G06F 3/0488 (2013.01)
G06F 3/0484 (2013.01)

(52) U.S. Cl.
CPC ....... *G06N 99/005* (2013.01); *G06F 3/04847* (2013.01); *G06F 3/04883* (2013.01)

(58) Field of Classification Search
CPC ....... G06F 2203/04808; G06F 3/04847; G06F 3/04883; G06N 99/005; G06K 9/00; G06T 7/00
USPC ............................................ 382/145; 706/11
See application file for complete search history.

(56) References Cited

U.S. PATENT DOCUMENTS 6,292,179 B1 * 9/2001 Lee .................. G06F 3/0236
345/168
7,478,273 B2 * 1/2009 Nakamura .......... G06F 11/1695
714/11
7,765,197 B2 * 7/2010 Fujiyama .......... G06F 17/30575
707/703
(Continued)

FOREIGN PATENT DOCUMENTS

JP 2001-156135 A 6/2001
JP 2003-317082 A 11/2003
(Continued)

OTHER PUBLICATIONS

View-Independent Facial Action Unit Detection Chuangao Tang; Wenming Zheng; Jingwei Yan; Qiang Li; Yang Li; Tong Zhang; Zhen Cui 2017 12th IEEE International Conference on Automatic Face & Gesture Recognition (FG 2017) Year: 2017 pp. 878-882 IEEE Conferences.*
(Continued)

Primary Examiner — Michael B Holmes

(57) ABSTRACT

The data processing device includes a display unit, a touch panel unit that detects a touch operation and outputs detection information, a flick detection unit, a label determination unit, and a teacher data generation unit. The flick detection unit detects a flick direction from the detection information of the touch panel unit. The label determination unit determines a label representing a category to which content belongs, based on the flick direction. The teacher data generation unit displays the content on the display unit, and generates teacher data including the displayed content and the label determined by the label determination unit.

7 Claims, 26 Drawing Sheets

(56) References Cited

U.S. PATENT DOCUMENTS

| | | | |
|---|---|---|---|
| 7,870,439 B2* | 1/2011 | Fujiyama | G06F 11/1641 714/11 |
| 8,117,295 B2* | 2/2012 | Nakamura | H04L 67/125 709/223 |
| 8,250,027 B2* | 8/2012 | Fujiyama | G06F 17/30427 707/602 |
| 8,489,620 B2* | 7/2013 | Kida | G01D 15/00 707/752 |
| 8,549,192 B2* | 10/2013 | Nakamura | G06F 17/30516 710/29 |
| 8,552,851 B2* | 10/2013 | Nakamura | B60W 40/08 340/439 |
| 8,756,093 B2* | 6/2014 | Isozaki | G06Q 10/0633 705/7.11 |
| 8,918,792 B2* | 12/2014 | Kanna | G06F 9/5016 718/100 |
| 8,966,492 B2* | 2/2015 | Kikuchi | H04L 41/147 370/328 |
| 9,235,492 B2* | 1/2016 | Kanna | G06F 11/3414 |
| 9,729,619 B2* | 8/2017 | Kuwako | H04L 67/10 |
| 2006/0274933 A1 | 12/2006 | Obara et al. | |
| 2008/0187212 A1* | 8/2008 | Obara | G06T 7/001 382/149 |
| 2011/0216094 A1 | 9/2011 | Murakami | |
| 2012/0131517 A1 | 5/2012 | Yamamoto | |
| 2014/0143683 A1 | 5/2014 | Underwood, IV et al. | |

FOREIGN PATENT DOCUMENTS

| | | |
|---|---|---|
| JP | 2006-189915 A | 7/2006 |
| JP | 2011-158373 A | 8/2011 |
| JP | 2011-186734 A | 9/2011 |
| JP | 2012-128830 A | 7/2012 |
| JP | 2013-025745 A | 2/2013 |
| JP | 2013-117972 A | 6/2013 |
| JP | 2015-535125 A | 12/2015 |
| WO | 2013/109626 A1 | 7/2013 |

OTHER PUBLICATIONS

Combined Use of Rear Touch Gestures and Facial Feature Detection to Achieve Single-Handed Navigation of Mobile Devices Yoshikazu Onuki; Itsuo Kumazawa IEEE Transactions on Human-Machine Systems Year: 2016, vol. 46, Issue: 5 pp. 684-693 IEEE Journals & Magazines.*

Numerical Simulation of Mutual Capacitance Touch Screens for Ungrounded Objects Christian Bjørge Thoresen; Ulrik Hanke IEEE Sensors Journal Year: 2017, vol. 17, Issue: 16 pp. 5143-5152 IEEE Journals & Magazines.*

Electric Hum Signal Readout Circuit for Touch Screen Panel Applications Pei-Yi Lai Lee; Chih-Wen Lu; Chih-Cheng Hsieh; Tsin-Yuan Chang; Jenny Yi-Chun Liu; Hsin-Chin Liang; Hsiang-Ning Wu Journal of Display Technology Year: 2016, vol. 12, Issue: 11 pp. 1444-1450 IEEE Journals & Magazines.*

Japanese Office Action for JP Application No. 2014-022045 dated Nov. 7, 2017 with English Translation.

* cited by examiner

| FLICK DIRECTION $\theta$ | LABEL |
|---|---|
| $0° \leqq \theta < 45°$ | Man |
| $45° \leqq \theta < 90°$ | Boy |
| $90° \leqq \theta < 135°$ | Girl |
| $135° \leqq \theta < 180°$ | Woman |

FIG. 9

| FLICK SPEED S (PIXEL/SEC) | CERTAINTY FACTOR |
|---|---|
| S<50 | 0 |
| 50≦S<100 | (S−50)/50 |
| S≧100 | 1 |

| FLICK DIRECTION $\theta$ | LABEL | CERTAINTY FACTOR |
|---|---|---|
| $0° \leqq \theta < 90°$ | OK | $(90-\theta)/90$ |
| $90° \leqq \theta < 270°$ | NG | $1-|\theta-180|/90$ |
| $270° \leqq \theta < 360°$ | OK | $(\theta-270)/90$ |

| SHAKE DIRECTION θ | LABEL |
|---|---|
| 0° ≦ θ < 90° | OK |
| 90° ≦ θ < 270° | NG |
| 270° ≦ θ < 360° | OK |

| TILT DIRECTION | LABEL |
|---|---|
| Right | OK |
| Left | NG |

# DATA PROCESSING DEVICE

INCORPORATION BY REFERENCE

The present invention is based upon and claims the benefit of priority from Japanese patent application No. 2014-022045, filed on Feb. 7, 2014, the disclosure of which is incorporated herein in its entirety by reference.

TECHNICAL FIELD

The present invention relates to a data processing device, a data processing method, and a program, which support the work of creating, by a user, teacher data to be used for machine learning.

BACKGROUND ART

In the field of video monitoring, video analysis, and the like, processing of mechanically classifying units of content such as image data into several categories, using a data processing device, has been performed. For example, in the step of manufacturing a substrate such as a printed wiring board, a technique of analyzing image data capturing a substrate having a defect and classifying it into a category according to the type of the defect is proposed as first related art of the present invention (see JP 2011-158373 A (Patent Document 1), for example). In order to realize such classification, it is necessary to allow a data processing device to learn. In order to allow a data processing device to learn, content such as image data, serving as inputs, and teacher data consisting of case examples of input and output pairs representing types of categories, serving as outputs, are required.

Basically, teacher data is generated by manpower. However, creating proper teacher data requires much time and labor. As such, some devices and systems which support creation of teacher data by manpower have been proposed.

For example, as for creation of teacher data necessary for classification into categories according to the type of a defect, a technique of displaying a defect image of a printed wiring board on a display, and accepting an input, from a keyboard and a mouse, of a category in which a user considers that the displayed defect image belongs to, is proposed as second related art of the present invention (see JP 2003-317082 A (Patent Document 2), for example).

Further, at the same time as imputing a category, inputting a certainty factor with respect to the category is also proposed as third related art of the present invention (see JP 2006-189915 A (Patent Document 3), for example). In more detail, when an operator selects a particular area displayed on a screen, a pulldown menu for inputting a category and a certainty factor is displayed on the screen, whereby it is possible to input a desired category and a certainty factor by operating a mouse pointer on the menu.

Patent Document 1: JP 2011-158373 A
Patent Document 2: JP 2003-317082 A
Patent Document 3: JP 2006-189915 A However, as input using a keyboard and a mouse involves sound, the place for creating teacher data is limited. This means that the sound of tapping keys with fingers on the keyboard and the click sound caused when performing a mouse click operation disturb the people around the operator.

SUMMARY

An exemplary object of the present invention is to provide a data processing device which solves the above-described problem, that is, a problem that the place for creating teacher data is limited.

A data processing device, according to a first exemplary aspect of the present invention, includes a display unit;

a touch panel unit that detects a touch operation and outputs detection information;

a flick detection unit that detects a direction of a flick from the detection information of the touch panel unit;

a label determination unit that determines a label representing a category to which content belongs, based on the direction of the flick; and a teacher data generation unit that displays the content on the display unit, and generates teacher data including the content and the label determined by the label determination unit.

A data processing method, according to a second exemplary aspect of the present invention, is a data processing method performed by a data processing device including a display unit and a touch panel unit that detects a touch operation and outputs detection information. The method includes displaying content on the display unit;

detecting a direction of a flick from the detection information of the touch panel unit;

determining a label representing a category to which the content belongs, based on the direction of the flick; and generating teacher data including the content and the label.

A program, according to a third exemplary aspect of the present invention, causes a computer, including a display unit and a touch panel unit that detects a touch operation and outputs detection information, to function as a flick detection unit that detects a direction of a flick from the detection information of the touch panel unit;

a label determination unit that determines a label representing a category to which content belongs, based on the direction of the flick; and a teacher data generation unit that displays the content on the display unit, and generates teacher data including the content and the label determined by the label determination unit.

With the above-described configuration, the present invention is able to create teacher data without any limitation on the place. This is because a user is able to input a label representing the category to which the content belongs, by means of an operation called flick which does not cause any sound when inputting.

BRIEF DESCRIPTION OF DRAWINGS

FIG. 4 is a diagram showing another exemplary configuration of a correspondence table between flick directions and labels according to the first exemplary embodiment of the present invention;

FIG. 9 is a diagram showing an exemplary configuration of a correspondence table between flick speeds and certainty factors of a label according to the second exemplary embodiment of the present invention;

FIG. 12 is a diagram showing an exemplary configuration of a correspondence table between flick directions, labels, and certainty factors according to the third exemplary embodiment of the present invention;

FIG. 19 is a diagram showing an exemplary configuration of a correspondence table between shake directions and labels according to the sixth exemplary embodiment of the present invention;

FIG. 22 is a diagram showing an exemplary configuration of a correspondence table between tilt directions and labels according to the seventh exemplary embodiment of the present invention:

EXEMPLARY EMBODIMENTS

Next, exemplary embodiments of the present invention will be described in detail with reference to the drawings.

First Exemplary Embodiment

Figure 1:
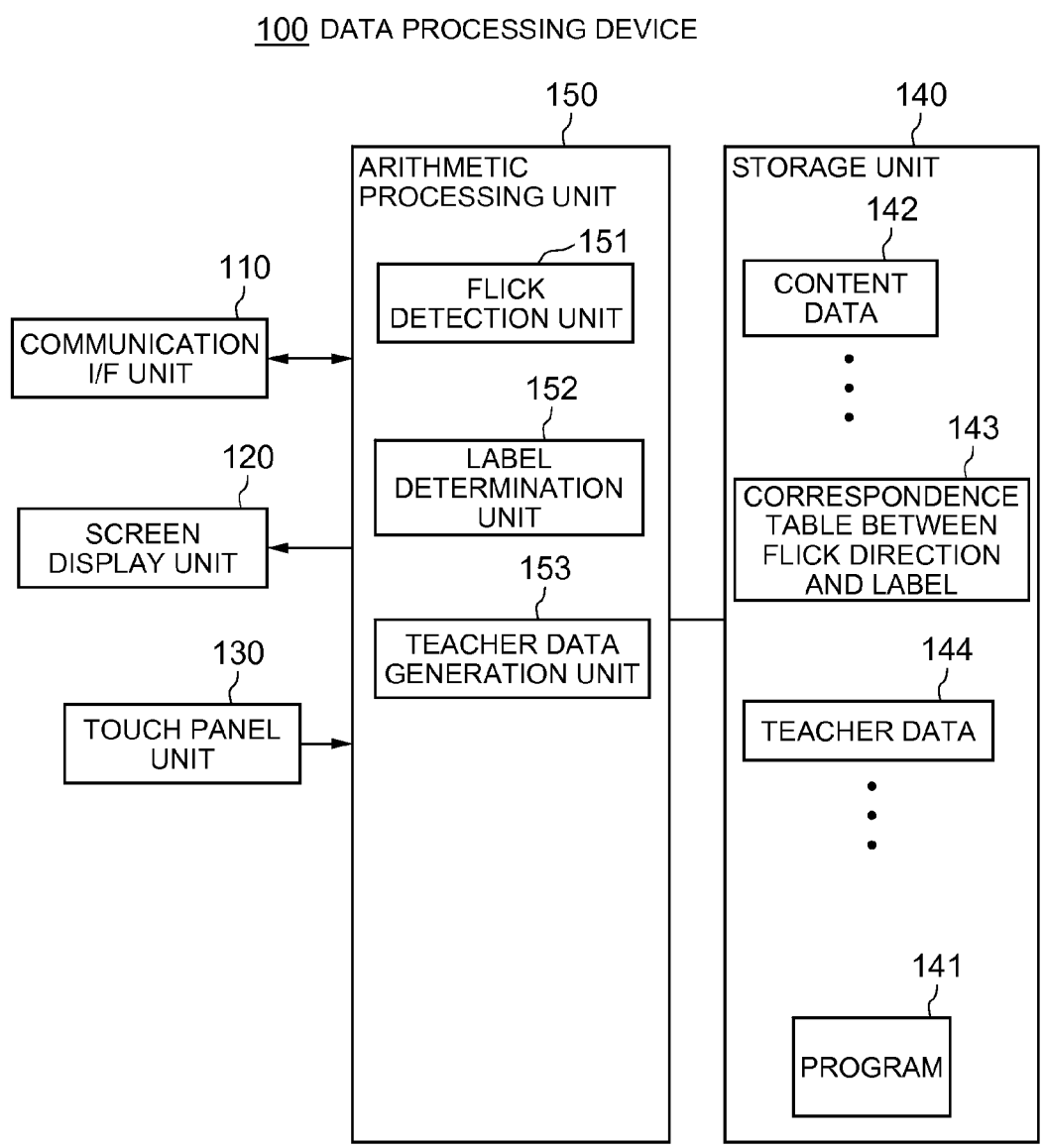
FIG. 1 is a block diagram of a first exemplary embodiment of the present invention.

Referring to FIG. 1, a data processing device 100 according to a first exemplary embodiment of the present invention has a function of supporting the work of creating, by a user, teacher data to be used for machine learning.

The data processing device 100 includes, as main functions, a communication interface unit (hereinafter referred to as communication I/F unit) 110, a screen display unit 120, a touch panel unit 130, a storage unit 140, and an arithmetic processing unit 150.

The communication I/F unit 110 is configured of a dedicated data communication circuit, and has a function of performing data communications with various types of devices connected over communication lines not shown.

The screen display unit 120 is configured of a screen display device such as an LCD (Liquid Crystal Display) or a PDP (Plasma Display Panel), and has a function of displaying various types of information such as content on a screen according to instructions from the arithmetic processing unit 150.

The touch panel unit 130 is configured of an operation input device such as a touch panel, and has a function of detecting a touch operation by a user and outputting detection information to the arithmetic processing unit 150. The detection information may be coordinate values on the touch panel and the time information thereof, for example.

The storage unit 140 is configured of a storage device such as a hard disk and a memory, and has a function of storing processing information and a program 141 necessary for various types of processing performed in the arithmetic processing unit 150. The program 141 is a program which realizes various types of processing units by being read and executed by the arithmetic processing unit 150, and is read in advance from an external device (not shown) or a storage medium (not shown) via a data input/output function such as the communication I/F unit 110 and stored in the storage unit 140. Main processing information to be stored in the storage unit 140 includes a plurality of types of content data 142, a correspondence table 143, and a plurality of types of teacher data 144.

The content data 142 is configured of a set of content and an ID thereof. Content may be image data, audio data, text data, or any combination thereof. The content data 142 is read from an external device (not shown) or a storage medium (not shown) via a data input/output function such as the communication I/F unit 110, and stored in the storage unit 140.

Figure 2:
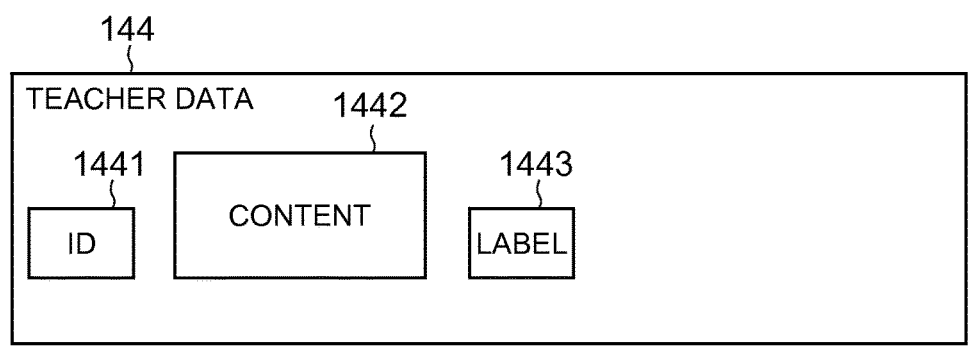
FIG. 2 is a diagram showing an exemplary configuration of teacher data according to the first exemplary embodiment of the present invention.

The teacher data 144 is data to be used for machine learning. The teacher data 144 is generated from the content data 142 by means of a method described below, and stored in the storage unit 140. FIG. 2 is an exemplary configuration of the teacher data 144. Each unit of teacher data 144 is configured of a set of an ID 1441, content 1442, and a label 1443. The content ID 1441 and the content 1442 are the same as the content ID and the content constituting the content data 142. The label 1443 represents a category to which the content 1442 belongs. The types of categories may be two types or three or more types. For example, in the case of applying the data processing device 100 to video monitoring and detecting an intruding object from respective frame images of a video captured by a monitor camera not shown, it is acceptable that the content 1442 is an frame image, the ID 1441 is either a frame number which uniquely identifies the frame image or time information, and the label 1443 is either one of two types, namely "OK" representing normal (no intruding object is shown in the frame image) and "NG" representing abnormal (intruding object is shown in the frame image).

Figure 3:
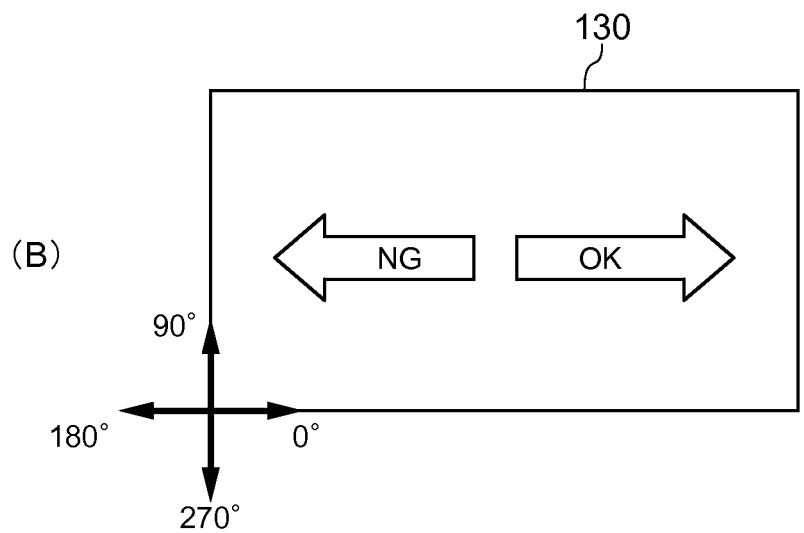
FIG. 3 is a diagram showing an exemplary configuration of a correspondence table between flick directions and labels according to the first exemplary embodiment of the present invention.

The correspondence table 143 is a table for associating a flick direction and a type of a label with each other. Flick means an operation of slightly sliding a pen or a finger touching the screen of a touch panel unit 330. FIG. 3(A) shows an exemplary configuration of the correspondence table 143. The correspondence table 143 shows that the case where the flick direction θ is not less than 0° but less than 90° and the case where the flick direction θ is not less than 270° but less than 360° correspond to a label of the type "OK", and the case where the flick direction θ is not less than 90° but less than 270° corresponds to a label of the type "NG". Accordingly, if a coordinate system in which a right direction is 0°, an upper direction is 90°, a left direction in 180°, and a lower direction is 270°, seen from the front side of the panel, is set on the panel plane of the touch panel unit 130 as shown in FIG. 3(B), when a user flicks toward the right direction side on the panel surface, a label "OK" can be input, while when a user flicks toward the left direction side, a label "NG" can be input.

FIG. 4 is another exemplary configuration of the correspondence table 143. This correspondence table 143 shows that the case where the flick direction θ is not less than 0° but less than 45° corresponds to a label of the type "man", the case where the flick direction θ is not less than 45° but less than 90° corresponds to a label of the type "boy", the case where the flick direction θ is not less than 90° but less than 135° corresponds to a label of the type "girl", and the case where the flick direction θ is not less than 135° but less than 180° corresponds to a label of the type "woman".

The arithmetic processing unit 150 includes a processor such as an MPU and the peripheral circuits thereof, and has a function of reading and executing the program 141 from the storage unit 140 to thereby allow the hardware and the program 141 to cooperate with each other so as to realize various types of processing units. The main processing units realized by the arithmetic processing unit 150 include a flick detection unit 151, a label determination unit 152, and a teacher data generation unit 153.

The flick detection unit 151 has a function of detecting a flick direction from detection information of the touch panel unit 130. For example, the flick detection unit 151 may obtain and store a coordinate on a touched panel (hereinafter referred to as a touch coordinate) and time information from the touch panel unit 130, detect whether or not the touch is a flick based on the touch coordinates from the start to the end of the touch, and detect a flick direction if it is a flick. For example, if a distance between a touch coordinate when the touch starts and a touch coordinate when the touch ends is not less than a given length, the touch may be detected as a flick. Further, a direction from a touch coordinate when the touch starts toward a touch coordinate when the touch ends may be detected as a flick direction.

The label determination unit 152 has a function of determining a label representing a category to which content displayed on the screen display unit 120 belongs, according to the flick direction detected by the flick detection unit 151. Specifically, the label determination unit 152 reads the correspondence table 143 from the storage unit 140, and determines a label recorded in the correspondence table 143 corresponding to the flick direction detected by the flick detection unit 151 to be a label which represents the category to which the content belongs.

The teacher data generation unit 153 has function of, for each content data 142, reading the content data 142 from the storage unit 140 and displays it on the screen display unit 120, generating the teacher data 144 including the displayed content data 142 and the label determined by the label determination unit 152, and storing it in the storage unit 140.

Next, operation of the data processing device 100 according to the present embodiment will be described with reference to the flowchart of FIG. 5.

When the teacher data generation unit 153 of the arithmetic processing unit 150 in the data processing device 100 is activated, the teacher data generation unit 153 reads one unit of content data 142 from the storage unit 140 and displays it on the screen display unit 120 (step S101).

Figure 6:
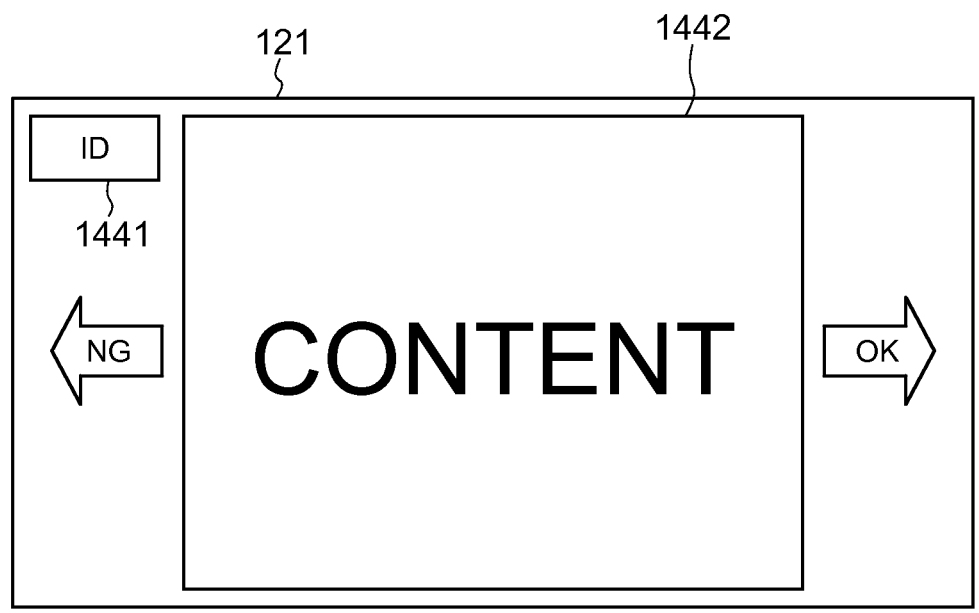
FIG. 6 is a flowchart showing an example of a teacher data generation screen according to the first exemplary embodiment of the present invention.

FIG. 6 shows an example of a teacher data generation screen 121 of the screen display unit 120. The teacher data generation screen 121 of this example displays the content 1442 in the center portion of the screen, and displays the ID 1441 on the left side thereof. Further, guidance information guiding a user to flick in a right direction for "OK" and flick in a left direction for "NG" is displayed on both sides of the content 1442.

The user checks the content 1442 displayed on the screen display unit 120, determines the category of the content 1442, and flicks in a desired direction. In the example of FIG. 6, if the frame image of the displayed content 1442 is normal (no intruder), the user flicks in a right direction while if it is abnormal (there is an intruder), flicks in a left direction.

Figure 5:
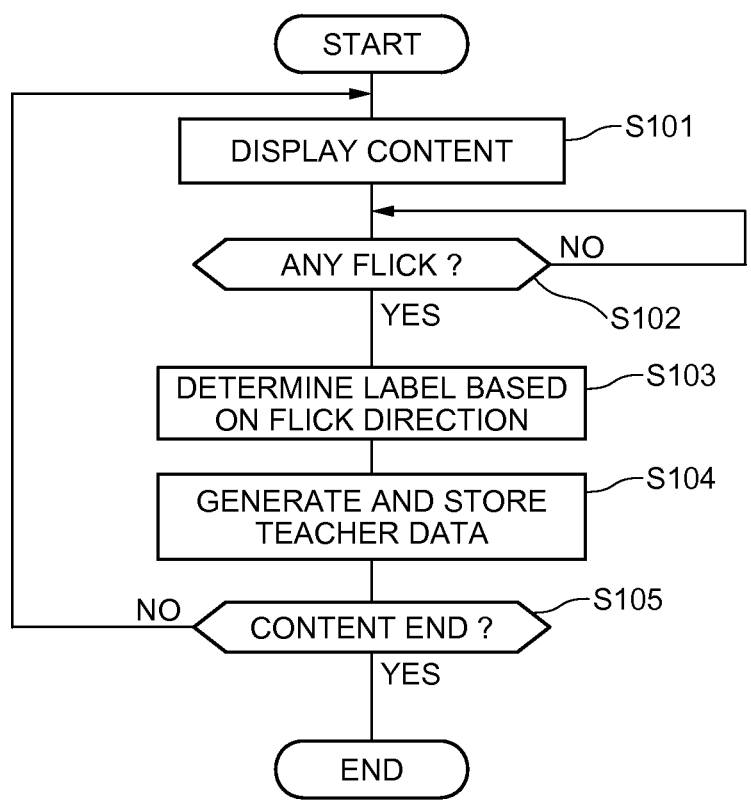
FIG. 5 is a flowchart showing an exemplary operation of the first exemplary embodiment of the present invention.

The flick detection unit 151 of the arithmetic processing unit 150 begins detection of a flick based on the detection information from the touch panel unit 130, after the teacher data generation unit 153 displays the content 1442 on the screen display unit 120 (step S102 in FIG. 5). Upon detection of the flick, the flick detection unit 151 transmits the flick direction to the label determination unit 152. The label determination unit 152 determines the label based on the transmitted flick direction and the correspondence table 143, and transmits it to the teacher data generation unit 153 (step S103).

When the label is input from the label determination unit 152, the teacher data generation unit 153 generates the teacher data 144 configured of the ID 1441 displayed on the screen display unit 120, the content 1442, and the input label 1443, and stores it in the storage unit 140 (step S104). Then, the teacher data generation unit 153 checks whether or not there is any content not having been displayed to the user in the storage unit 140 (step S105). Then, if there remains any non-displayed content, the teacher data generation unit 153 returns to the processing of step S101 and repeats the same processing as the above-described processing. On the other hand, if there remains no non-displayed content, the teacher data generation unit 153 ends the teacher data generation processing.

In this way, according to the present embodiment, teacher data can be created without any limitation on the place. This is because a user is able to input a label representing the category to which the content belongs by an operation called flick which does not cause any sound when inputting. As such, flick does not cause physical sound which disturbs people around the operator.

Second Exemplary Embodiment

Figure 7:
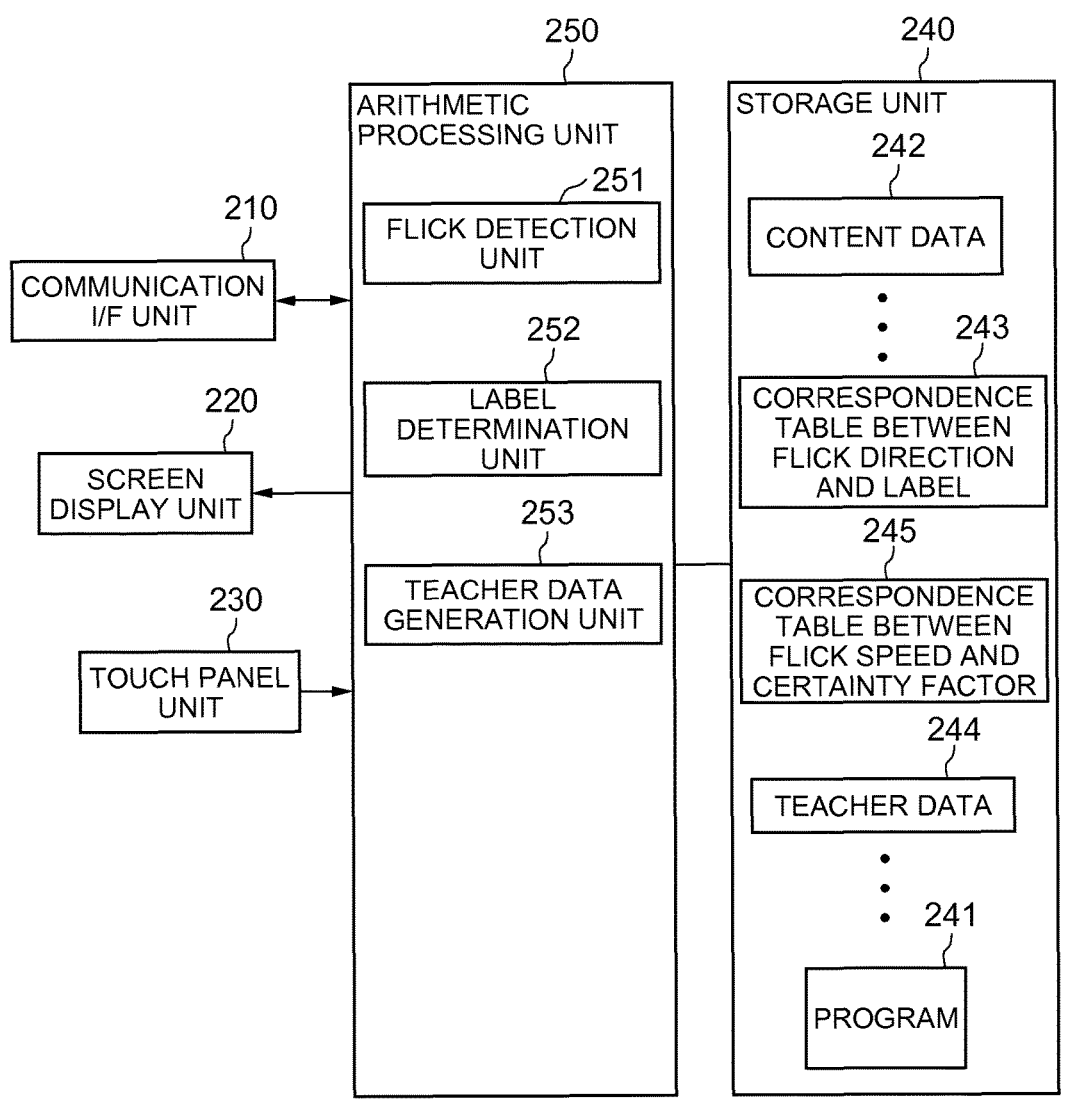
FIG. 7 is a block diagram of a second exemplary embodiment of the present invention.

Referring to FIG. 7, a data processing device 200 according to a second exemplary embodiment of the present invention has a function of supporting the work of creating, by a user, teacher data with certainty factors to be used for machine learning.

The data processing device 200 includes, as main functional units, a communication IF unit 210, a screen display unit 220, a touch panel unit 230, a storage unit 240, and an arithmetic processing unit 250. Among them, the communication I/F unit 210, the screen display unit 220, and the touch panel unit 230 have the same functions as those of the communication I/F unit 110, the screen display unit 120, and the touch panel unit 130 of the first exemplary embodiment of the present invention shown in FIG. 1.

The storage unit 240 is configured of a storage device such as a hard disk and a memory, and has a function of storing processing information and a program 241 necessary for various types of processing performed in the arithmetic processing unit 250. The program 241 is a program which realizes various types of processing units by being read and executed by the arithmetic processing unit 250, and is read in advance from an external device (not shown) or a storage medium (not shown) via a data input/output function such as the communication I/F unit 210 and stored in the storage unit 240. Main processing information to be stored in the storage unit 240 includes a plurality of units of content data 242, a correspondence table 243 between flick directions and labels, a plurality of units of teacher data 244, and a correspondence table 245 between flick speeds and certainty factors. Among them, the content data 242 and the correspondence table 243 are the same as the content data 142 and the correspondence table 143 in the first exemplary embodiment of the present invention shown in FIG. 1.

Figure 8:
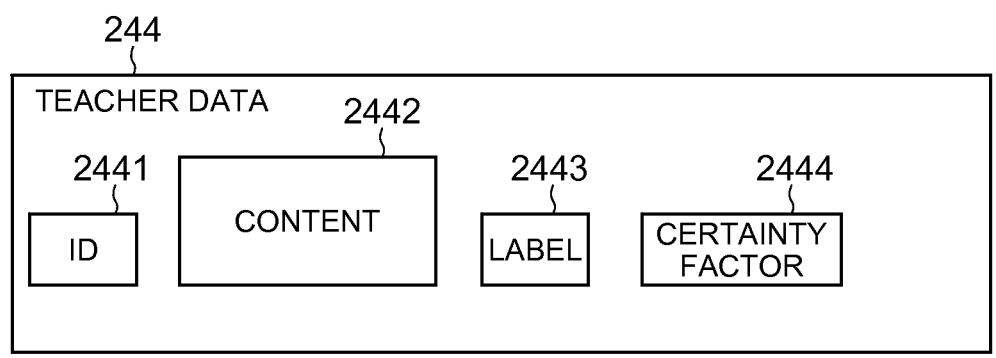
FIG. 8 is a diagram showing an exemplary configuration of teacher data according to the second exemplary embodiment of the present invention.

The teacher data 244 is data used for machine learning. The teacher data 244 is generated from the content data 242 by means of a method described below, and stored in the storage unit 240. FIG. 8 is an exemplary configuration of the teacher data 244. Each unit of teacher data 244 is configured of a set of an ID 2441, content 2442, a label 2443, and a certainty factor 2444. The content ID 2441 and the content 2442 are the same as the content ID and the content constituting the content data 242. The label 2443 represents a category to which the content 2442 belongs.

The certainty factor 2444 is a certainty factor of the label 2443. In the present embodiment, the certainty factor 2444 takes a value from 0 to 1, in which as the value is closer to 1, the accuracy of the label 2443 is higher, while as the value is closer to 0, the accuracy of the label 2443 is lower. For example, if the label 2443 is "OK" representing normal and the certainty factor is 1, it is shown that the user determines that the content 2442 belongs to the category of normal with a probability of 100%. Meanwhile, if the label 2443 is "NG" representing abnormal and the certainty factor is 1, it is shown that the content 2442 belongs to the category of abnormal with a probability of 100%. Further, if the label 2443 is "OK" representing normal or "NG" representing abnormal and the certainty factor is 0, it is shown that which category the content 2442 belongs to is unknown.

The correspondence table 245 is a table associating flick speeds with certainty factors of a label. FIG. 9 is an exemplary configuration of the correspondence table 245. The correspondence table 245 shows that the case where the flick speed S is less than 50 pixel/second corresponds to a certainty factor 0, the case where the flick speed S is not less than 50 pixel/second but less than 100 pixel/second corresponds to a certainty factor $(S-50)/50$, and the case where the flick speed S is not less than 100 pixel/second corresponds to a certainty factor 1.

The arithmetic processing unit 250 includes a processor such as an MPU and the peripheral circuits thereof, and has a function of reading the program 241 from the storage unit 240 and executing it to thereby realize various types of processing units by allowing the hardware and the program 241 to cooperate with each other. Main processing units realized by the arithmetic processing unit 250 include a flick detection unit 251, a label determination unit 252, and a teacher data generation unit 253.

The flick detection unit 251 has a function of detecting a direction and a speed of a flick from detection information of the touch panel unit 230. For example, the flick detection unit 251 may obtain and store a coordinate on a touched panel (hereinafter referred to as touch coordinate) and time information from the touch panel unit 230, detect whether or not the touch is a flick by means of the same method as that of the flick detection unit 151 in the first exemplary embodiment of the present invention, and detect a flick direction if it is a flick. Further, the flick detection unit 251 may calculate a flick speed by dividing a distance from the touch coordinate when the touch starts to the touch coordinate when the touch ends, by the time from the touch start time to the touch end time.

The label determination unit 252 has a function of determining a label representing a category to which the content displayed on the screen display unit 220 belongs, and the certainty factor thereof, according to the direction and the speed of the flick detected by the flick detection unit 251. Specifically, the label determination unit 252 reads the correspondence table 243 from the storage unit 240, and determines a label recorded in the correspondence table 243 corresponding to the flick direction detected by the flick detection unit 251, to be a label which represents the category to which the content belongs. Further, the label determination unit 252 reads the correspondence table 245 from the storage unit 240, and determines the certainty factor recorded in the correspondence table 245 corresponding to the flick speed detected by the flick detection unit 251, to be the certainty factor of the label.

The teacher data generation unit 253 has a function of, for each content data 242, reading the content data 242 from the storage unit 240 and displays it on the screen display unit 220, generating the teacher data 244 including the displayed content data 242 and the label and the certainty factor determined by the label determination unit 252, and storing it in the storage unit 240.

Next, operation of the data processing device 200 according to the present embodiment will be described with reference to the flowchart of FIG. 10.

When the teacher data generation unit 253 of the arithmetic processing unit 250 in the data processing device 200 is activated, the teacher data generation unit 253 reads one unit of content data 242 from the storage unit 240 and displays it on the screen display unit 220 (step S201). A user checks the content displayed on the screen display unit 220, determines the category of the content, and flicks in a desired direction. At this time, the user expresses the credibility of the own determination by the flick speed. Specifically, the user makes the flick speed faster as the credibility is higher, but makes the flick speed slower when the user is not confident in the determination so that the credibility is lower.

Figure 10:
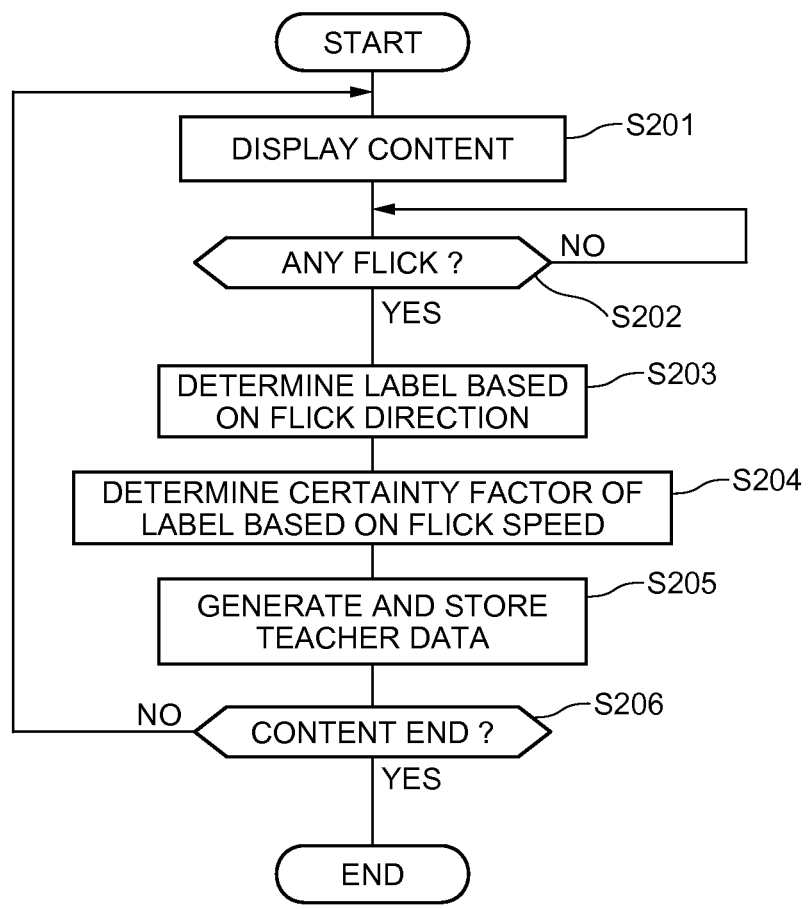
FIG. 10 is a flowchart showing an exemplary operation of the second exemplary embodiment of the present invention.

The flick detection unit 251 of the arithmetic processing unit 250 begins detection of a flick based on the detection information from the touch panel unit 230, after the teacher data generation unit 253 displays the content data 242 on the screen display unit 220 (step S202 in FIG. 10). Upon detection of the flick, the flick detection unit 251 transmits the direction and the speed of the flick to the label determination unit 252. The label determination unit 252 determines a label based on the transmitted flick direction and the correspondence table 243 (step S203). Further, the label determination unit 252 determines a certainty factor based on the transmitted flick speed and the correspondence table 245 (step S204). Then, the label determination unit 252 transmits the label and the certainty factor to the teacher data generation unit 253.

When the label and the certainty factor are input from the label determination unit 252, the teacher data generation unit 253 generates the teacher data 244 configured of the ID 2441 displayed on the screen display unit 220, the content 2442, the input label 2443, and the certainty factor 2444, and stores it in the storage unit 240 (step S205). Then, the teacher data generation unit 253 checks whether or not there is any content not having been displayed to the user in the storage unit 240 (step S206). Then, if there remains any non-displayed content, the teacher data generation unit 253 returns to the processing of step S201 and repeats the same processing as the above-described processing. On the other hand, if there remains no non-displayed content, the teacher data generation unit 253 ends the teacher data generation processing.

In this way, according to the present embodiment, teacher data can be created without any limitation on the place. This is because a user is able to input a label representing the category to which the content belongs by an operation called flick which does not cause any sound when inputting.

Further, according to the present embodiment, a user is able to input a label and a certainty factor of the label by one operation called flick. As such, compared with the case of inputting a label and the certainty factor thereof by separate operations, it is possible to reduce a burden on the user and to realize quick inputting.

Third Exemplary Embodiment

Figure 11:
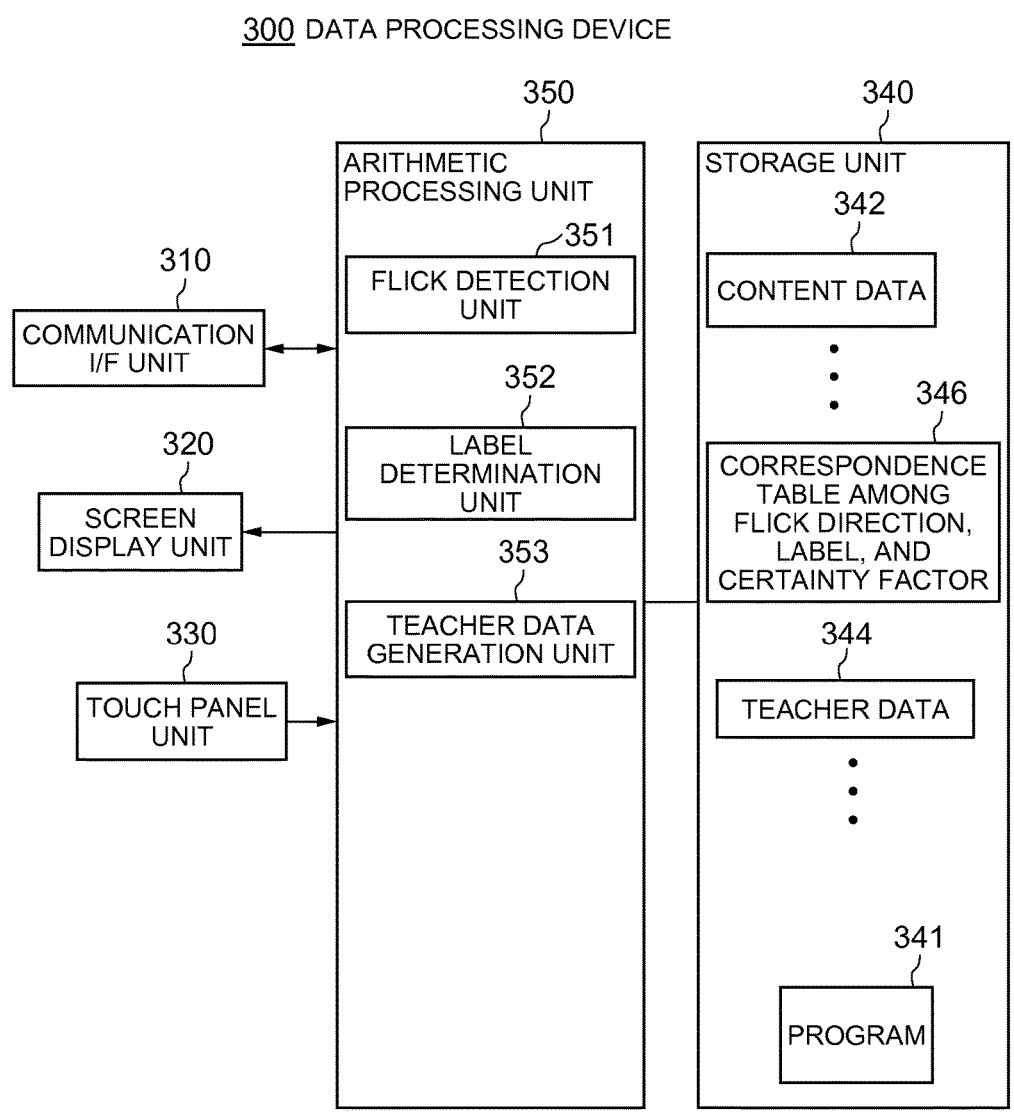
FIG. 11 is a block diagram of a third exemplary embodiment of the present invention.

Referring to FIG. 11, a data processing device 300 according to a third exemplary embodiment of the present invention has a function of supporting creation, by a user, of teacher data with certainty factors to be used for machine learning.

The data processing device 300 includes, as main functions, a communication I/F unit 310, a screen display unit 320, a touch panel unit 330, a storage unit 340, and an arithmetic processing unit 350. Among them, the communication I/F unit 310, the screen display unit 320, and the touch panel unit 330 have the same functions as those of the communication I/F unit 110, the screen display unit 120, and the touch panel unit 130 of the first exemplary embodiment of the present invention shown in FIG. 1.

The storage unit 340 is configured of a storage device such as a hard disk and a memory, and has a function of storing processing information and a program 341 necessary for various types of processing performed in the arithmetic processing unit 350. The program 341 is a program which realizes various types of processing units by being read and executed by the arithmetic processing unit 350, and is read in advance from an external device (not shown) or a storage medium (not shown) via a data input/output function such as the communication I/F unit 310 and stored in the storage unit 340. Main processing information to be stored in the storage unit 340 includes a plurality of units of content data 342, a plurality of units of teacher data 344, and a correspondence table 346 among flick directions, labels, and certainty factors. Among them, the content data 342 and the teacher data 344 are the same as the content data 242 and the teacher data 244 in the second exemplary embodiment of the present invention shown in FIG. 7. As such, the teacher data 244 is configured of a set of the ID (2441), the content (2442), the label (2443), and the certainty factor (2444) thereof.

The correspondence table 346 is a table associating flick directions, labels, and certainty factors thereof. FIG. 12 shows an exemplary configuration of the correspondence table 346. The correspondence table 346 shows that the case where the flick direction θ is not less than 0° but less than 90° and the case where the flick direction θ is not less than 270° but less than 360° correspond to a label of the type "OK", and the case where the flick direction θ is not less than 90° but less than 270° corresponds to a label of the type "NG". Further, the correspondence table 346 shows that if the flick direction θ is not less than 0° but less than 90°, the certainty factor is (90−θ)/90, if the flick direction θ is not less than 90° but less than 270°, the certainty factor is 1−|θ−180|/90, and if the flick direction θ is not less than 270° but less than 360°, the certainty factor is (θ−270)/90. Accordingly, if the flick direction is 0°, the label is "OK" with a certainty factor 1, if the flick direction is 180°, the label is "NG" with a certainty factor 1, and if the flick direction is 315°, the label is "OK" with a certainty factor 0.5.

The arithmetic processing unit 350 includes a processor such as an MPU and the peripheral circuits thereof, and has a function of reading the program 341 from the storage unit 340 and executing it to thereby realize various types of processing units by allowing the hardware and the program 341 to cooperate with each other. Main processing units realized by the arithmetic processing unit 350 include a flick detection unit 351, a label determination unit 352, and a teacher data generation unit 353.

The flick detection unit 351 has a function of detecting a direction of a flick from detection information of the touch panel unit 330, similar to the flick detection unit 251 in the first exemplary embodiment of the present invention.

The label determination unit 352 has a function of determining a label representing a category to which the content displayed on the screen display unit 320 belongs, and the certainty factor thereof, according to the direction of the flick detected by the flick detection unit 351. Specifically, the label determination unit 352 reads the correspondence table 346 from the storage unit 340, and determines a label and a certainty factor recorded in the correspondence table 346 corresponding to the flick direction detected by the flick detection unit 351, to be a label which represents the category to which the content belongs and the certainty factor thereof.

The teacher data generation unit 353 has a function of, for each unit of content data 342, reading the content data 342 from the storage unit 340 and displays it on the screen display unit 320, generating the teacher data 344 including the displayed content data 342 and the label and the certainty factor determined by the label determination unit 352, and storing it in the storage unit 340.

Next, operation of the data processing device 300 according to the present embodiment will be described with reference to the flowchart of FIG. 13.

When the teacher data generation unit 353 of the arithmetic processing unit 350 in the data processing device 300 is activated, the teacher data generation unit 353 reads one unit of content data 342 from the storage unit 340 and displays it on the screen display unit 320 (step S301). A user checks the content displayed on the screen display unit 320, determines the category of the content, and flicks in a desired direction. At this time, the user expresses the credibility of the own determination by adjusting the direction of the flick. Specifically, if labels have two types namely "OK" and "NG" and the correspondence table 346 is the one shown in FIG. 12, when a label "OK" is input, the direction of a flick is made to be closer to 0° direction as the credibility is higher, while the direction of a flick is made to have a difference from 0° direction when the user is not confident in the determination so that the credibility is lower. However, if the difference becomes 90° or larger, as a label "NG" is input instead of a label "OK", the difference should be within a range of 90° or less.

Figure 13:
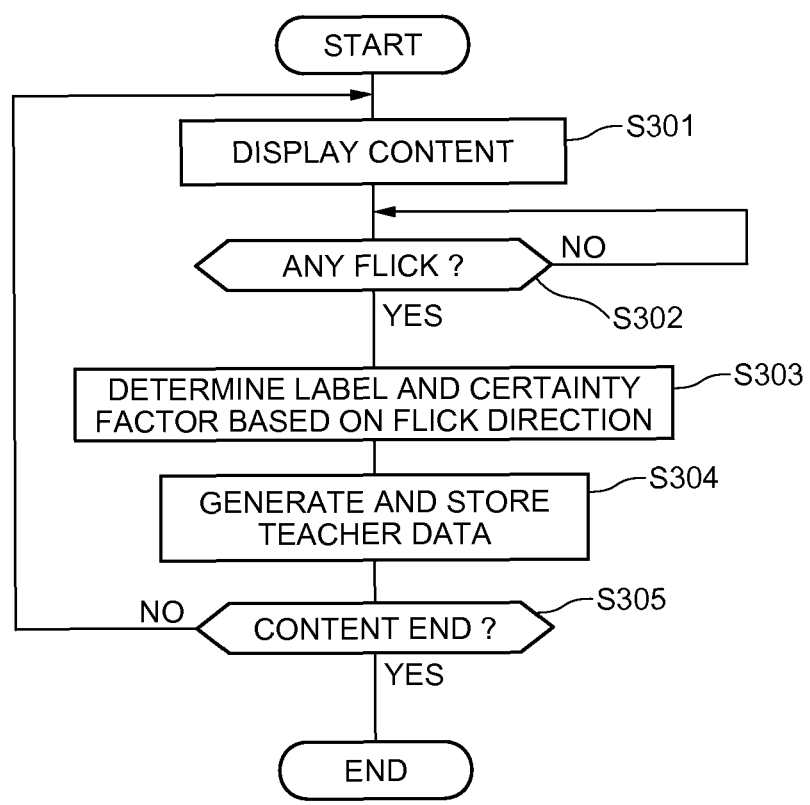
FIG. 13 is a flowchart showing an exemplary operation of the third exemplary embodiment of the present invention.

The flick detection unit 351 of the arithmetic processing unit 350 begins detection of a flick based on the detection information from the touch panel unit 330, after the teacher data generation unit 353 displays the content data 342 on the screen display unit 320 (step S302 in FIG. 13). Upon detection of the flick, the flick detection unit 351 transmits the direction of the flick to the label determination unit 352. The label determination unit 352 determines a label based on the transmitted flick direction and the correspondence table 346 (step S303). Then, the label determination unit 352 transmits the label and the certainty factor to the teacher data generation unit 353.

When the label and the certainty factor are input from the label determination unit 352, the teacher data generation unit 353 generates the teacher data 344 configured of the ID (2441) displayed on the screen display unit 320, the content (2442), the input label (2443), and the certainty factor (2444), and stores it in the storage unit 340 (step S304). Then, the teacher data generation unit 353 checks whether or not there is any content not having been displayed to the user in the storage unit 340 (step S305). If there remains any non-displayed content, the teacher data generation unit 353 returns to the processing of step S301 and repeats the same processing as the above-described processing. On the other hand, if there remains no non-displayed content, the teacher data generation unit 353 ends the teacher data generation processing.

In this way, according to the present embodiment, teacher data can be created without any limitation on the place. This is because a user is able to input a label representing the category to which the content belongs by an operation called flick which does not cause any sound when inputting.

Further, according to the present embodiment, a user is able to input a label and a certainty factor of the label by one operation called flick. As such, compared with the case of inputting a label and the certainty factor thereof in separate operations, it is possible to reduce a burden on the user and to realize quick inputting.

Fourth Exemplary Embodiment

Figure 14:
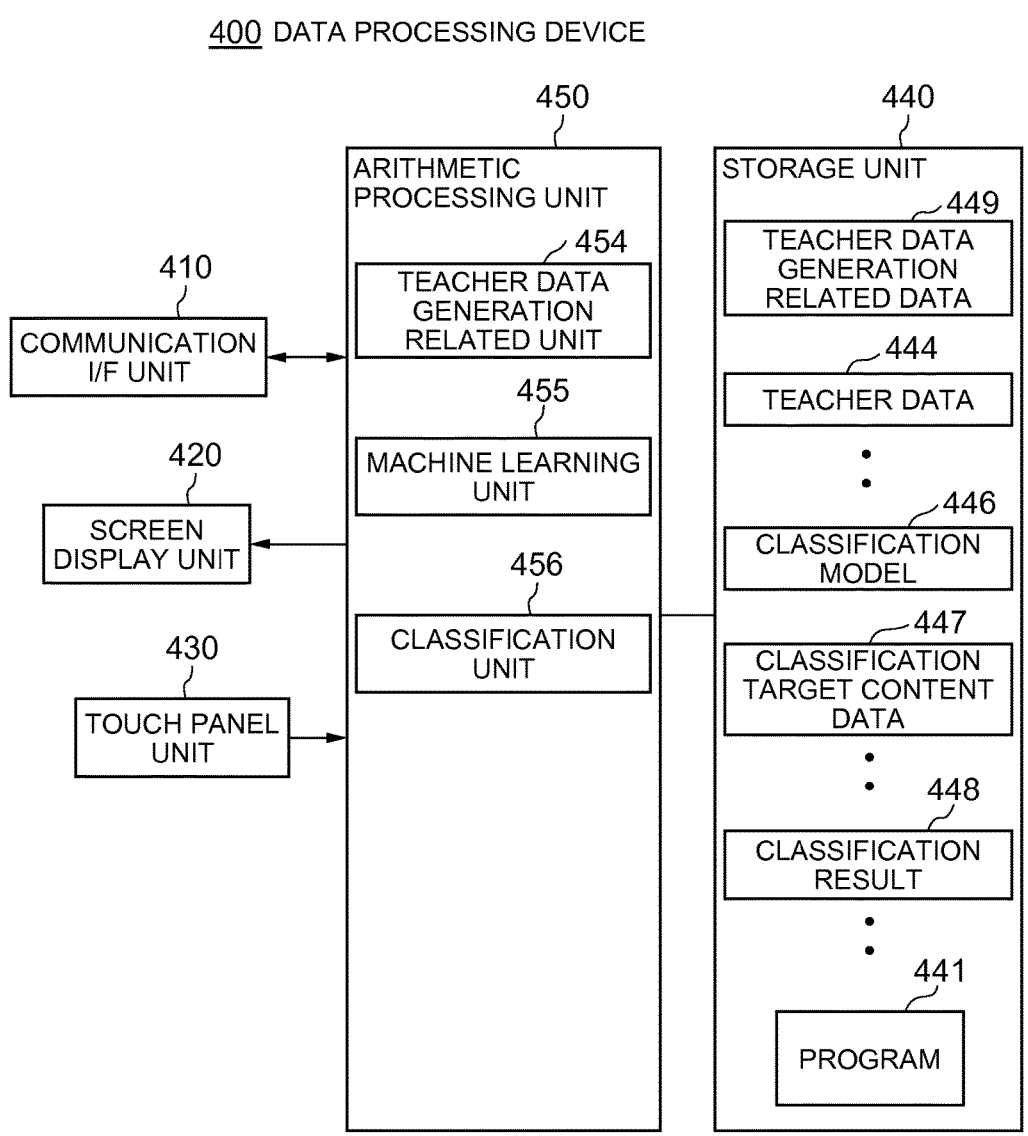
FIG. 14 is a block diagram of a fourth exemplary embodiment of the present invention.

Referring to FIG. 14, a data processing device 400 according to a fourth exemplary embodiment of the present invention has a function of supporting creation, by a user, of teacher data with certainty factors to be used for machine learning, and a function of performing automatic classification using the generated teacher data.

The data processing device 400 includes, as main functions, a communication I/F unit 410, a screen display unit 420, a touch panel unit 430, a storage unit 440, and an arithmetic processing unit 450. Among them, the communication I/F unit 410, the screen display unit 420, and the touch panel unit 430 have the same functions as those of the communication I/F unit 110, the screen display unit 120, and the touch panel unit 130 of the first exemplary embodiment of the present invention shown in FIG. 1.

The storage unit 440 is configured of a storage device such as a hard disk and a memory, and has a function of storing processing information and a program 441 necessary for various types of processing performed in the arithmetic processing unit 450. The program 441 is a program which realizes various types of processing units by being read and executed by the arithmetic processing unit 450, and is read in advance from an external device (not shown) or a storage medium (not shown) via a data input/output function such as the communication I/F unit 410 and stored in the storage unit 440. Main processing information to be stored in the storage unit 440 includes a plurality of units of teacher data 444, a classification mode 446, a plurality of units of classification target content data 447, a plurality of classification results 448, and teacher data generation related data 449. Among them, the teacher data generation related data 449 is the same as the content data 142 and the correspondence table 143 in the first exemplary embodiment of the present invention shown in FIG. 1. Further, the teacher data 444 is the same as the teacher data 144 in the first exemplary embodiment of the present invention shown in FIG. 1. As such, the teacher data 444 is configured of a set of the ID (1441), the content (1442), and the label (1443).

The classification model 446 is a classification model generated using a plurality of teacher data 444. A classification model is generated by mathematically modeling a category appropriate for content to belong to. A classification model can be realized using SVM (Support Vector Machine) or a neutral network, for example.

The classification target content data 447 is content data which is a target of automatic classification. The classification target content data 447 is configured of a set of content and an ID thereof. Content may be image data, audio data, text data, or any combination thereof. The content in the classification target content data 447 is content of the same type as that of the content used for generating the teacher data 444. The classification target content data 447 is read from an external device (not shown) or a storage medium (not shown) via a data input/output function such as the communication I/F unit 410 and stored in the storage unit 440.

Figure 15:
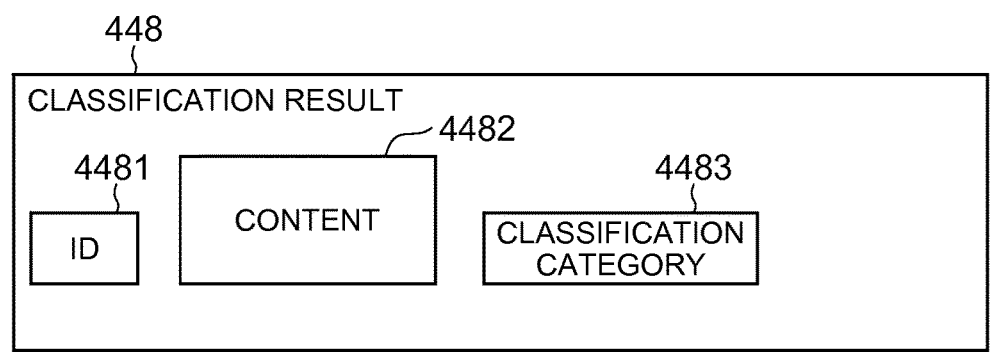
FIG. 15 is a diagram showing an exemplary configuration of a classification result according to the fourth exemplary embodiment of the present invention.

The classification result 448 is information of a result of classifying a category to which the content of the classification target content data 447 belongs, using the classification model 446. FIG. 15 is an exemplary configuration of the classification result 448. Each classification result 448 is configured of a set of an ID 4481, content 4482, and a classification category 4483. Each classification result 448 corresponds to each classification target content data 447 one to one. The ID 4481 and the content 4482 in each classification result 448 are the same as the ID and the content in the classification target content data 447 corresponding thereto. The classification category 4483 in each classification result 448 is a category of a result of determining the category to which the content in the classification target content data 447 belongs, using the classification model 446. It should be noted that as content same as the content 4482 can be searched from the classification target content data 447 using the ID 4481 in the classification result 448 as a key, the content 4482 in the classification result 448 may be omitted.

The arithmetic processing unit 450 includes a processor such as an MPU and the peripheral circuits thereof, and has a function of reading the program 441 from the storage unit 440 and executing it to thereby realize various types of processing units by allowing the hardware and the program 441 to cooperate with each other. Main processing units realized by the arithmetic processing unit 450 include a teacher data generation related unit 454, a machine learning unit 455, and a classification unit 456. Among them, the teacher data generation related unit 454 has the functions of the flick detection unit 151, the label determination unit 152, and the teacher data generation unit 153 of the first exemplary embodiment of the present invention shown in FIG. 1.

The machine learning unit 455 has a function of reading a plurality of units of teacher data 444 from the storage unit 440, generating (learning) the classification model 446 using content and labels in the units of teacher data 444, and storing the generated classification model 446 in the storage unit 440.

The classification unit 456 has a function of reading a plurality of units of classification target content data 447 and the classification model 446 from the storage unit 440, determining a category to which the content belongs in the units of classification target content data 447 using the classification model 446, and storing the classification result 448 including the determined category in the storage unit 440. Further, the classification unit 456 may read the classification result 448 from the storage unit 440, display it on the screen display unit 420, and also transmit it to an external device via the communication I/F unit 410.

Next, operation of the data processing device 400 according to the present embodiment will be described. Operation of the data processing device 400 according to the present embodiment is largely divided into a teacher data generation operation, a machine learning operation, and an automatic classification operation. The teacher data generation operation is the same as the first exemplary embodiment of the present invention shown in FIG. 1. Hereinafter, the machine learning operation and the automatic classification operation will be described in detail.

Figure 16:
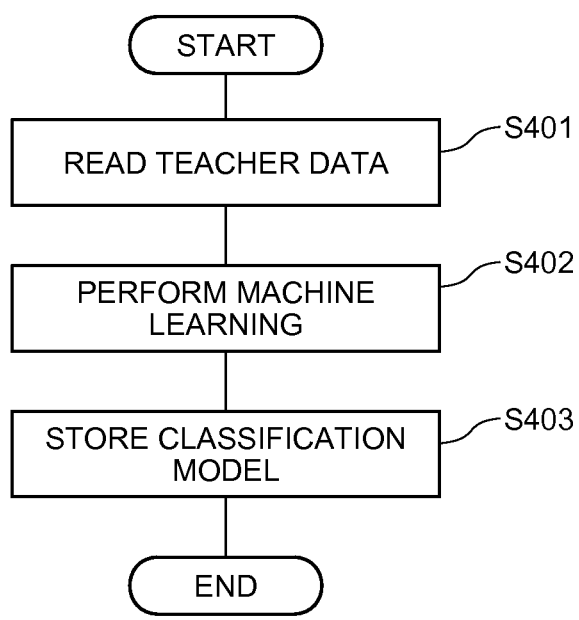
FIG. 16 is a flowchart showing an exemplary operation of a machine learning unit according to the fourth exemplary embodiment of the present invention.

First, the machine learning operation of the data processing device 400 according to the present embodiment will be described with reference to the flowchart of FIG. 16 showing exemplary processing of the machine learning unit 455.

When the machine learning unit 455 of the arithmetic processing unit 450 in the data processing device 400 is activated, the machine learning unit 455 first reads a plurality of units of teacher data 444 from the storage unit 440 (step S401). Then, the machine learning unit 455 performs machine learning for generating the classification model 446 using the content and the label in each unit of the teacher data 444 read (step S402). Finally, the machine learning unit 455 stores the classification model 446 generated by the machine learning in the storage unit 440 (step S403).

Figure 17:
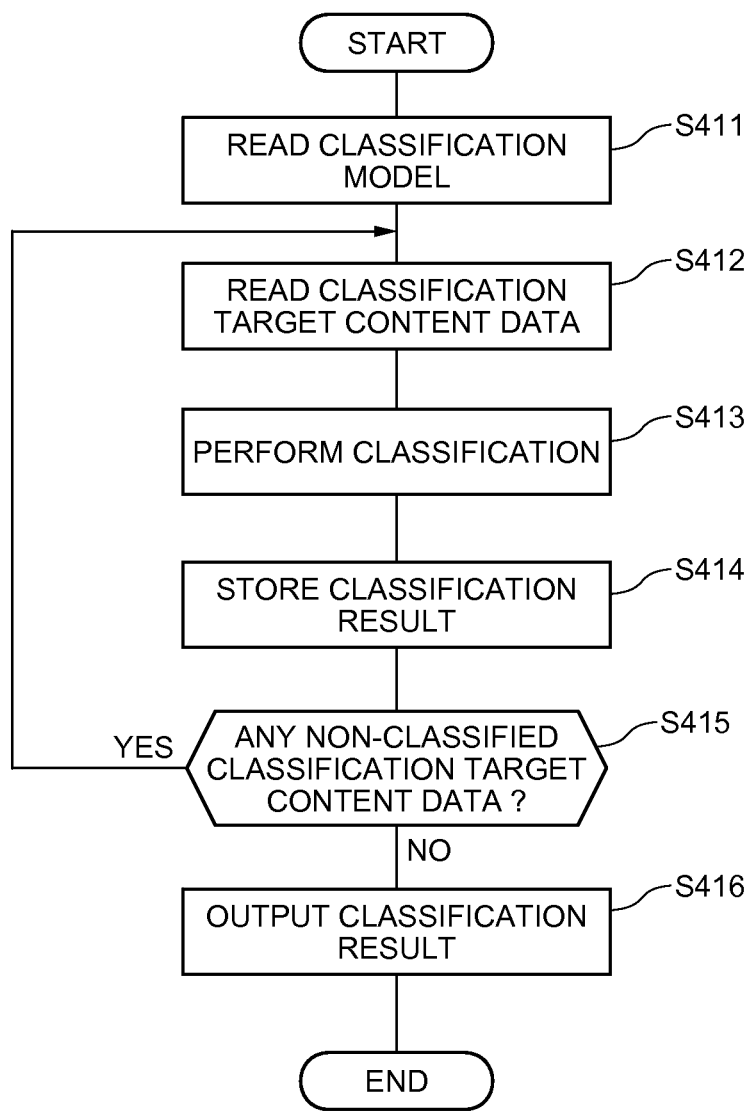
FIG. 17 is a flowchart showing an exemplary operation of a classification unit according to the fourth exemplary embodiment of the present invention.

Next, the classification operation of the data processing device 400 according to the present embodiment will be described with reference to the flowchart of FIG. 17 showing exemplary processing of the classification unit 456.

When the classification unit 456 of the arithmetic processing unit 450 in the data processing device 400 is activated, the classification unit 456 first reads the classification model 446 from the storage unit 440 (Step S411). Then, the classification unit 456 reads one unit of classification target content data 447, which has not been a target of the classification processing, from the storage unit 440 (step S412), determines a category to which the content in the classification target content data 447 belongs, using the classification model 446 (step S413), and stores the classification result 448 including the determined category in the storage unit 440 (step S414).

Then, the classification unit 456 checks whether or not there is any unit of classification target content data 447 not having been a target of the classification processing in the storage unit 440 (step S415), and if there remains a unit of classification target content data 447 not having been processed, the classification unit 456 returns to the processing of step S412 and repeats the same processing as that described above. On the other hand, if there remains no unit of classification target content data 447 not having been processed, the classification unit 456 reads the classification result 448 from the storage unit 440, displays it on the screen display unit 420, and also transmits it to the outside from the communication I/F unit 410 (step S416). Then, the classification processing ends.

In this way, according to the present embodiment, it is possible to achieve the same effects as those of the first exemplary embodiment of the present invention, and to automatically classify classification target content data using the generated teacher data.

Fifth Exemplary Embodiment

The present embodiment is an embodiment in which the teacher data generation function in the fourth exemplary embodiment is replaced with the teacher data generation function described in the second or third exemplary embodiment.

In the case of having a teacher data generation function which is the same as that of the second exemplary embodiment, the teacher data generation related data 449 of FIG. 14 is the same data as the content data 242 and the correspondence tables 243 and 245 of FIG. 7, the teacher data generation related unit 454 has the same functions as those of the flick detection unit 251, the label determination unit 252, and the teacher data generation unit 253 of FIG. 7, and the machine learning unit 455 has a function of learning a classification model in such a manner that teacher data having a label of higher certainty factor is handled as more significant teacher data than teacher data having a label of lower certainty factor, that is, a weighted learning function.

Further, in the case of having a teacher data generation function which is the same as that of the third exemplary embodiment, the teacher data generation related data 449 of FIG. 14 is the same data as the content data 342 and the correspondence table 346 of FIG. 11, the teacher data generation related unit 454 has the same function as those of the flick detection unit 351, the label determination unit 352, and the teacher data generation unit 353 of FIG. 11, and the machine learning unit 455 has the weighted learning function.

According to the present embodiment, it is possible to achieve the same effects as those of the second and third exemplary embodiments of the present invention, and to classify classification target content data automatically using the created teacher data with certainty factors.

Sixth Exemplary Embodiment

Figure 18:
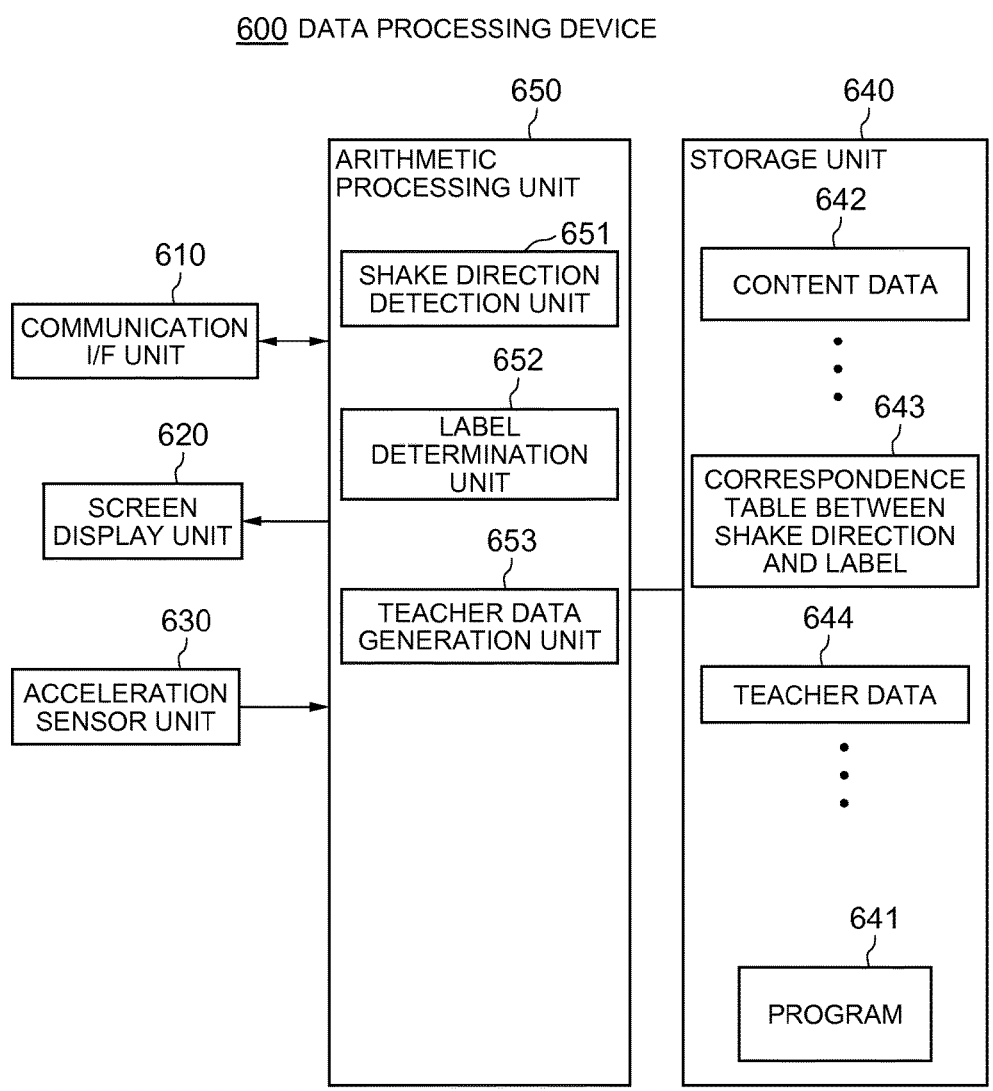
FIG. 18 is a block diagram of a sixth exemplary embodiment of the present invention.

Referring to FIG. 18, a data processing device 600 according to a sixth exemplary embodiment of the present invention has a function of supporting the work, by a user, of creating teacher data to be used for machine learning using an input mode by means of a shake operation.

The data processing device 600 includes, as main functions, a communication I/F unit 610, a screen display unit 620, an acceleration sensor unit 630, a storage unit 640, and an arithmetic processing unit 650. Among them, the communication I/F unit 610 and the screen display unit 620 have the same functions as those of the communication I/F unit 110 and the screen display unit 120 of the first exemplary embodiment of the present invention shown in FIG. 1.

The acceleration sensor unit 630 has a function of detecting a shake and outputting detection information to the arithmetic processing unit 650. The acceleration sensor unit 630 may be set (installed) at any location. The acceleration sensor unit 630 may be provided inside the main casing of the data processing device 600, or provided to another casing separating from the main casing. In that case, it is desirable that the acceleration sensor unit 630 and the arithmetic processing unit 650 are connected via wireless communications.

The storage unit 640 is configured of a storage device such as a hard disk and a memory, and has a function of storing processing information and a program 641 necessary for various types of processing performed in the arithmetic processing unit 650. The program 641 is a program which realizes various types of processing units by being read and executed by the arithmetic processing unit 650, and is read in advance from an external device (not shown) or a storage medium (not shown) via a data input/output function such as the communication I/F unit 610 and stored in the storage unit 640. Main processing information to be stored in the storage unit 640 includes a plurality of units of content data 642, a correspondence table 643 between shake directions and labels, and a plurality of units of teacher data 644. Among them, the content data 642 and the teacher data 644 are the same as the content data 142 and the teacher data 144 in the first exemplary embodiment of the present invention shown in FIG. 1. As such, the teacher data 644 is configured of IDs, content, and labels.

The correspondence table 643 is a table associating shake directions and labels. FIG. 19 is an exemplary configuration of the correspondence table 643. The correspondence table 643 shows that the case where the shake direction θ is not less than 0° but less than 90° and the case where the shake direction θ is not less than 270° but less than 360° correspond to a label of the type "OK", and the case where the shake direction θ is not less than 90° but less than 270° corresponds to a label of the type "NG". Accordingly, if a right direction is 0° and a left direction is 180° in a state where the container containing the acceleration sensor unit 630 is in a given posture, a label "OK" can be input when the user shakes it in a right direction and a label "NG" can be input when the user shakes it in a left direction.

The arithmetic processing unit 650 includes a processor such as an MPU and the peripheral circuits thereof, and has a function of reading the program 641 from the storage unit 640 and executing it to thereby realize various types of processing units by allowing the hardware and the program 641 to cooperate with each other. Main processing units realized by the arithmetic processing unit 650 include a shake direction detection unit 651, a label determination unit 652, and a teacher data generation unit 653.

The shake direction detection unit 651 has a function of detecting a shake direction from detection information of the acceleration sensor unit 630.

The label determination unit 652 has a function of determining a label representing a category to which the content displayed on the screen display unit 620 belongs, according to the shake direction detected by the shake direction detection unit 651. Specifically, the label determination unit 652 reads the correspondence table 643 from the storage unit 640, and determines a label recorded in the correspondence table 643 corresponding to the shake direction detected by the shake direction detection unit 651, to be a label which represents the category to which the content belongs.

The teacher data generation unit 653 has a function of, for each unit of content data 642, reading the content data 642 from the storage unit 640 and displays it on the screen display unit 620, generating the teacher data 644 including the displayed content data 642 and the label determined by the label determination unit 652, and storing it in the storage unit 640.

Next, operation of the data processing device 600 according to the present embodiment will be described with reference to the flowchart of FIG. 20.

When the teacher data generation unit 653 of the arithmetic processing unit 650 in the data processing device 600 is activated, the teacher data generation unit 653 reads one unit of content data 642 from the storage unit 640 and displays it on the screen display unit 620 (step S601). A user checks the content displayed on the screen display unit 620, determines the category of the content, and shakes the container containing the acceleration sensor unit 630 in a desired direction.

Figure 20:
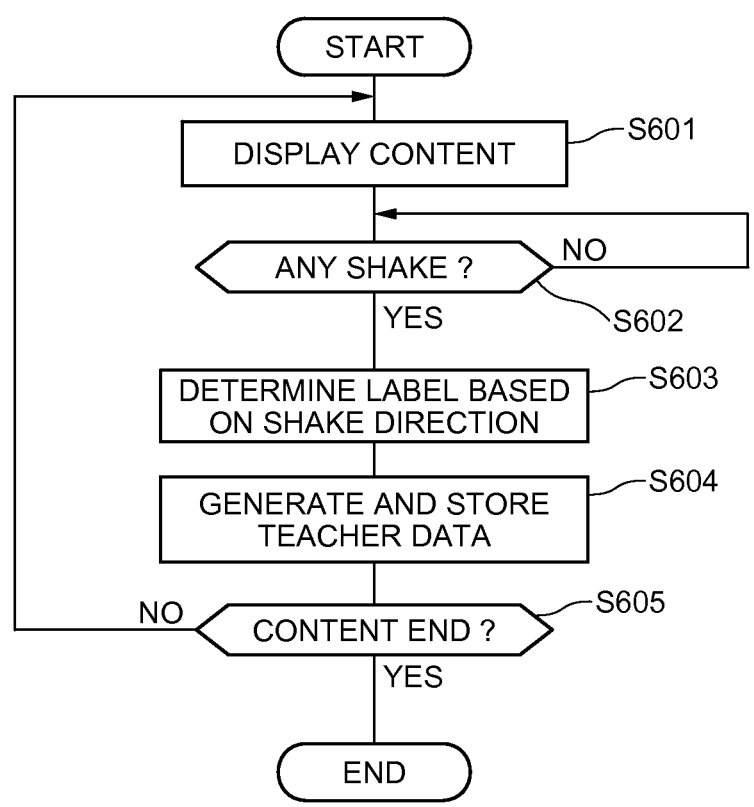
FIG. 20 is a flowchart showing an exemplary operation of the sixth exemplary embodiment of the present invention.

The shake direction detection unit 651 of the arithmetic processing unit 650 begins detection of a shake based on the detection information from the acceleration sensor unit 630, after the teacher data generation unit 653 displays the content data 642 on the screen display unit 620 (step S602 in FIG. 20). Upon detection of the shake, the shake direction detection unit 651 transmits the shake direction to the label determination unit 652. The label determination unit 652 determines a label based on the transmitted shake direction and the correspondence table 643 (step S603). Then, the label determination unit 652 transmits the label to the teacher data generation unit 653.

When the label is input from the label determination unit 652, the teacher data generation unit 653 generates the teacher data 644 configured of the ID displayed on the screen display unit 620, the content, and the input label, and stores it in the storage unit 640 (step S605). Then, the teacher data generation unit 653 checks whether or not there is any content not having been displayed to the user in the storage unit 640 (step S606). If there remains any non-displayed content, the teacher data generation unit 653 returns to the processing of step S601 and repeats the same processing as the above-described processing. On the other hand, if there remains no non-displayed content, the teacher data generation unit 653 ends the teacher data generation processing.

In this way, according to the shake input mode, teacher data can be created without any limitation on the place. This is because a user is able to input a label representing the category to which the content belongs by means of an operation of shaking an object which does not cause any sound when inputting.

Seventh Exemplary Embodiment

Figure 21:
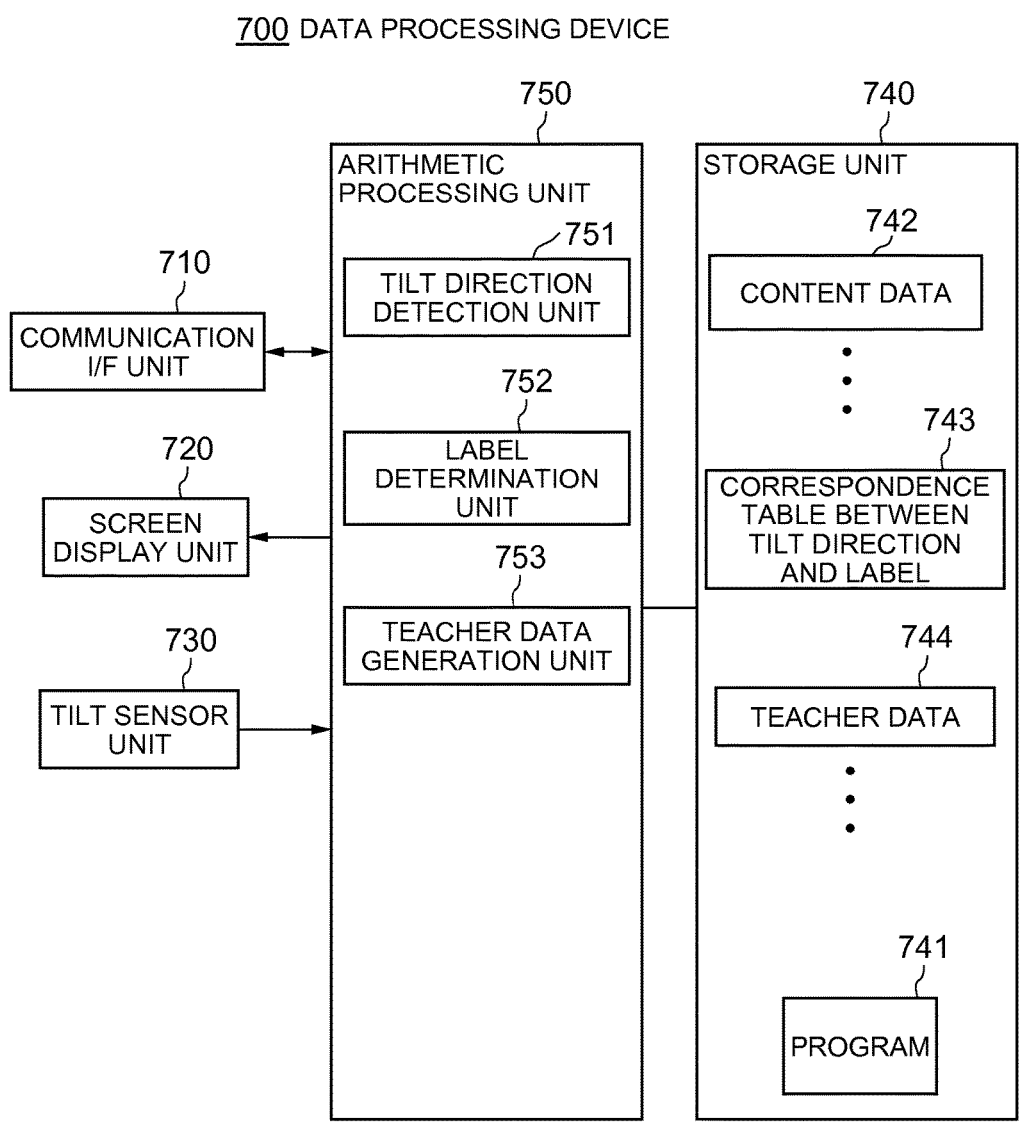
FIG. 21 is a block diagram of a seventh exemplary embodiment of the present invention.

Referring to FIG. 21, a data processing device 700 according to a seventh exemplary embodiment of the present invention has a function of supporting the work, by a user, of creating teacher data to be used for machine learning using an input mode by means of a tilt operation.

The data processing device 700 includes, as main functions, a communication I/F unit 710, a screen display unit 720, a tilt sensor unit 730, a storage unit 740, and an arithmetic processing unit 750. Among them, the communication I/F unit 710 and the screen display unit 720 have the same functions as those of the communication I/F unit 110 and the screen display unit 120 of the first exemplary embodiment of the present invention shown in FIG. 1.

The tilt sensor unit 730 is configured of a gyro or the like, and has a function of detecting a tilt and outputting detection information to the arithmetic processing unit 750. The tilt sensor unit 730 may be set (installed) at any location. The tilt sensor unit 730 may be provided inside the main casing of the data processing device 700, or provided to another casing separating from the main casing. In that case, it is desirable that the tilt sensor unit 730 and the arithmetic processing unit 750 are connected via wireless communications.

The storage unit 740 is configured of a storage device such as a hard disk and a memory, and has a function of storing processing information and the program 741 necessary for various types of processing performed in the arithmetic processing unit 750. The program 741 is a program which realizes various types of processing units by being read and executed by the arithmetic processing unit 750, and is read in advance from an external device (not shown) or a storage medium (not shown) via a data input/output function such as the communication I/F unit 710 and stored in the storage unit 740. Main processing information to be stored in the storage unit 740 includes a plurality of units of content data 742, a correspondence table 743 between tilt directions and labels, and a plurality of units of teacher data 744. Among them, the content data 742 and the teacher data 744 are the same as the content data 142 and the teacher data 144 in the first exemplary embodiment of the present invention shown in FIG. 1. As such, the teacher data 744 is configured of IDs, content, and labels.

Figure 22:
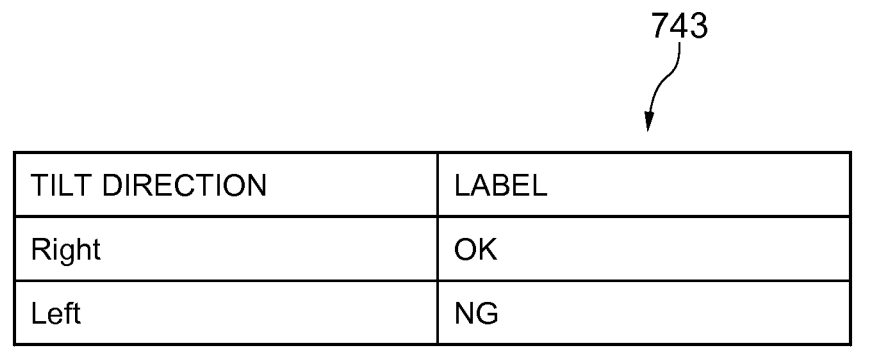

The correspondence table 743 is a table associating tilt directions and labels. FIG. 22 is an exemplary configuration of the correspondence table 743. The correspondence table 743 shows that when a tilt direction is right, a label of the type "OK" is associated, and when a tilt direction is left, a label of the type "NG" is associated. Accordingly, in a state where the container containing the tilt sensor unit 730 is set in a given posture, if a state where the right side of the container is tilted is set to be Right and the opposite case is set to be Left, when a user tilts the container so as to make the right side of the container lower, a label "OK" can be input, while when a user tilts the content so as to make the left side of the container lower, a label "NG" can be input.

The arithmetic processing unit 750 includes a processor such as an MPU and the peripheral circuits thereof, and has a function of reading the program 741 from the storage unit 740 and executing it to thereby realize various types of processing units by allowing the hardware and the program 741 to cooperate with each other. Main processing units realized by the arithmetic processing unit 750 include a tilt direction detection unit 751, a label determination unit 752, and a teacher data generation unit 753.

The tilt direction detection unit 751 has a function of detecting a tilt direction from the detection information of the tilt sensor unit 730.

The label determination unit 752 has a function of determining a label representing a category to which the content displayed on the screen display unit 720 belongs, according to the tilt direction detected by the tilt direction detection unit 6751. Specifically, the label determination unit 752 reads the correspondence table 743 from the storage unit 740, and determines a label recorded in the correspondence table 743 corresponding to the tilt direction detected by the tilt direction detection unit 751, to be a label which represents the category to which the content belongs.

The teacher data generation unit 753 has a function of, for each unit of content data 742, reading the content data 742 from the storage unit 740 and displays it on the screen display unit 720, generating the teacher data 744 including the displayed content data 742 and the label determined by the label determination unit 752, and storing it in the storage unit 740.

Next, operation of the data processing device 700 according to the present embodiment will be described with reference to the flowchart of FIG. 23.

When the teacher data generation unit 753 of the arithmetic processing unit 750 in the data processing device 700 is activated, the teacher data generation unit 753 reads one unit of content data 742 from the storage unit 740 and displays it on the screen display unit 720 (step S701). A user checks the content displayed on the screen display unit 720, determines the category of the content, and performs an operation to tilt the container containing the acceleration sensor unit 730 in a desired direction.

Figure 23:
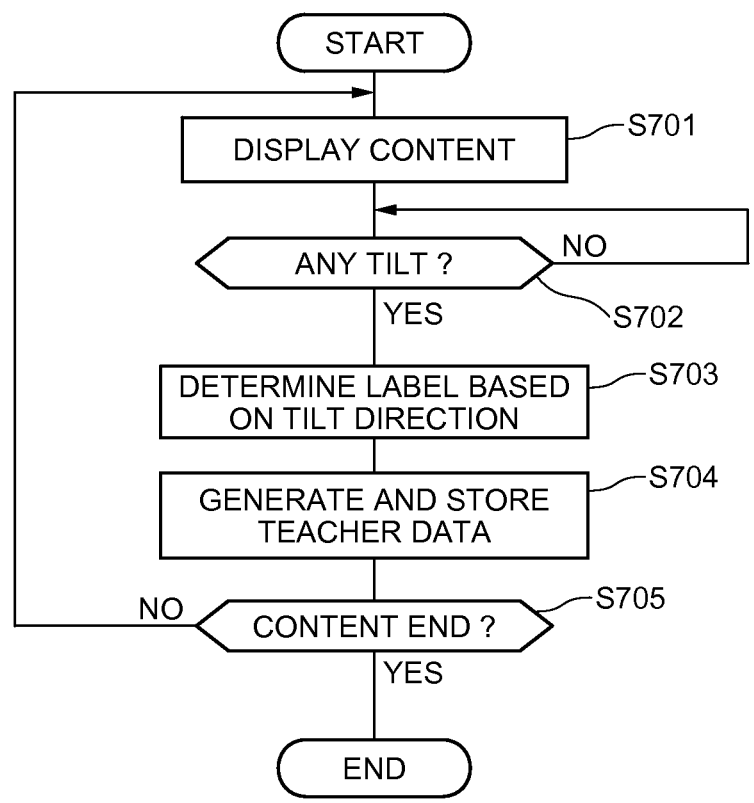
FIG. 23 is a flowchart showing an exemplary operation of the seventh exemplary embodiment of the present invention.

The tilt direction detection unit 751 of the arithmetic processing unit 750 begins detection of a tilt based on the detection information from the tilt sensor unit 730, after the teacher data generation unit 753 displays the content data 742 on the screen display unit 720 (step S702 in FIG. 23). Upon detection of the tilt, the tilt direction detection unit 751 transmits the tilt direction to the label determination unit 752. The label determination unit 752 determines a label based on the transmitted tilt direction and the correspondence table 743 (step S703). Then, the label determination unit 752 transmits the label to the teacher data generation unit 753.

When the label is input from the label determination unit 752, the teacher data generation unit 753 generates the teacher data 744 configured of the ID displayed on the screen display unit 720, the content, and the input label, and stores it in the storage unit 740 (step S704). Then, the teacher data generation unit 753 checks whether or not there is any content not having been displayed to the user in the storage unit 740 (step S705). Then, if there remains any non-displayed content, the teacher data generation unit 753 returns to the processing of step S701 and repeats the same processing as the above-described processing. On the other hand, if there remains no non-displayed content, the teacher data generation unit 753 ends the teacher data generation processing.

In this way, according to the input mode by means of a tilt operation, teacher data can be created without any limitation on the place. This is because a user is able to input a label representing the category to which the content belongs by an operation of tilting an object which does not cause sound when inputting.

Eighth Exemplary Embodiment

Figure 24:
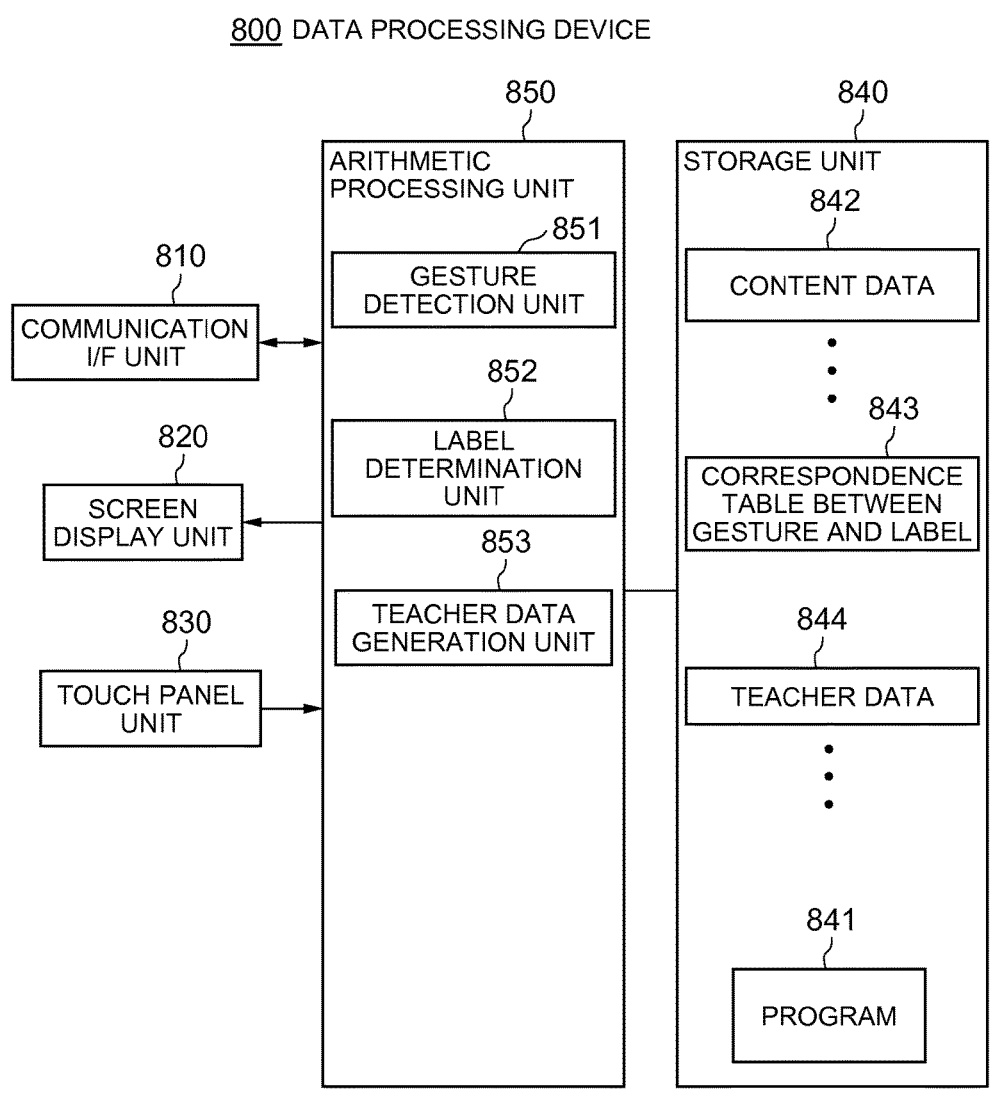
FIG. 24 is a block diagram of an eighth exemplary embodiment of the present invention.

Referring to FIG. 24, a data processing device 800 according to an eighth exemplary embodiment of the present invention has a function of supporting the work, by a user, of creating teacher data to be used for machine learning using an input mode by means of a gesture operation.

The data processing device 800 includes, as main functions, a communication I/F unit 810, a screen display unit 820, a touch panel unit 830, a storage unit 840, and an arithmetic processing unit 850. Among them, the communication I/F unit 810, the screen display unit 820, and the touch panel unit 830 have the same functions as those of the communication I/F unit 110, the screen display unit 120, and the touch panel unit 130 of the first exemplary embodiment of the present invention shown in FIG. 1.

The storage unit 840 is configured of a storage device such as a hard disk and a memory, and has a function of storing processing information and a program 841 necessary for various types of processing performed in the arithmetic processing unit 850. The program 841 is a program which realizes various types of processing units by being read and executed by the arithmetic processing unit 850, and is read in advance from an external device (not shown) or a storage medium (not shown) via a data input/output function such as the communication I/F unit 810 and stored in the storage unit 840. Main processing information to be stored in the storage unit 840 includes a plurality of units of content data 842, a correspondence table 843 between gestures and labels, and a plurality of units of teacher data 844. Among them, the content data 842 and the teacher data 844 are the same as the content data 142 and the teacher data 144 in the first exemplary embodiment of the present invention shown in FIG. 1. As such, the teacher data 844 is configured of IDs, content, and labels.

Figure 25:
FIG. 25 is a diagram showing an exemplary configuration of a correspondence table between gestures and labels according to the eighth exemplary embodiment of the present invention.

The correspondence table 843 is a table associating the types of gestures and labels. FIG. 25 is an exemplary configuration of the correspondence table 843. The correspondence table 843 shows that a gesture of drawing an alphabet V corresponds to a label of a type "OK", and a gesture of drawing a hyphen sign corresponds to a label of a type "NG".

The arithmetic processing unit 850 includes a processor such as an MPU and the peripheral circuits thereof, and has a function of reading the program 841 from the storage unit 840 and executing it to thereby realize various types of processing units by allowing the hardware and the program 841 to cooperate with each other. Main processing units realized by the arithmetic processing unit 850 include a gesture detection unit 851, a label determination unit 852, and a teacher data generation unit 853.

The gesture detection unit 851 has a function of detecting a flick direction from detection information of the touch panel unit 830. For example, the gesture detection unit 851 may obtain and store a coordinate on a touched panel (touch coordinate) and time information from the touch panel unit 830, and detect a type of gesture based on the locus of the touch coordinates from the start to the end of the touch.

The label determination unit 852 has a function of determining a label representing a category to which content displayed on the screen display unit 820 belongs, according to the type of the gesture detected by the gesture detection unit 851. Specifically, the label determination unit 852 reads the correspondence table 843 from the storage unit 840, and determines a label recorded in the correspondence table 843 corresponding to the type of the gesture detected by the gesture detection unit 851 to be a label which represents the category to which the content belongs.

The teacher data generation unit 853 has a function of, for each unit of content data 842, reading the content data 842 from the storage unit 840 and displays it on the screen display unit 820, generating the teacher data 844 including the displayed content data 842 and the label determined by the label determination unit 852, and storing it in the storage unit 840.

Next, operation of the data processing device 800 according to the present embodiment will be described with reference to the flowchart of FIG. 26.

When the teacher data generation unit 853 of the arithmetic processing unit 850 in the data processing device 800 is activated, the teacher data generation unit 853 reads one unit of content data 842 from the storage unit 840 and displays it on the screen display unit 820 (step S801). A user checks the content displayed on the screen display unit 820, determines the category of the content, and performs an operation to input a gesture of a desired type from the touch panel unit 830.

Figure 26:
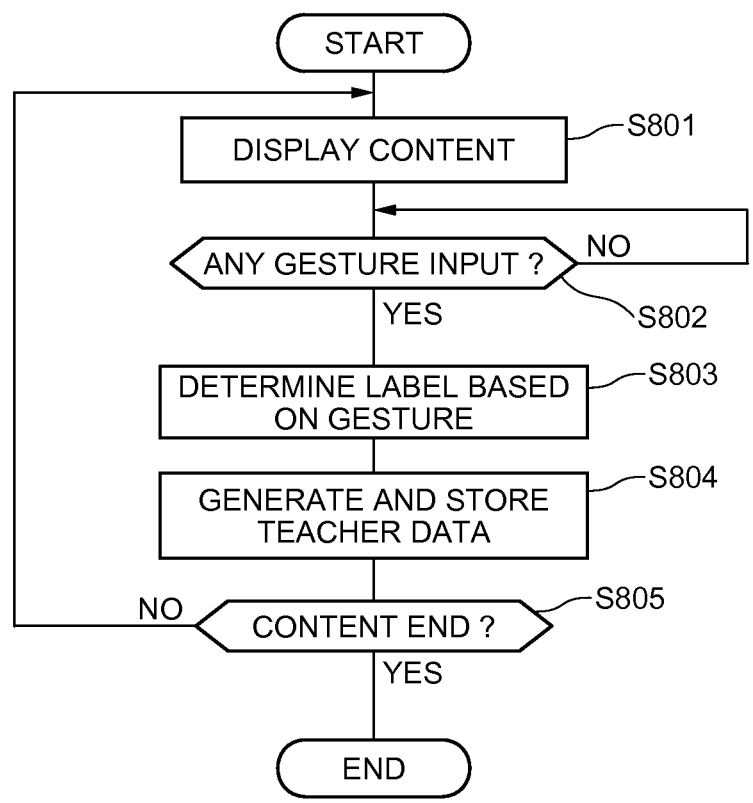
FIG. 26 is a flowchart showing an exemplary operation of the eighth exemplary embodiment of the present invention.

The gesture detection unit 851 of the arithmetic processing unit 850 begins detection of a gesture based on the detection information from the touch panel unit 830, after the teacher data generation unit 853 displays the content data 842 on the screen display unit 820 (step S802 in FIG. 26). Upon detection of the gesture, the gesture detection unit 851 determines the type and transmits it to the label determination unit 852. The label determination unit 852 determines a label based on the transmitted gesture type and the correspondence table 843 (step S803). Then, the label determination unit 852 transmits the label to the teacher data generation unit 853.

When the label is input from the label determination unit 852, the teacher data generation unit 853 generates the teacher data 844 configured of the ID displayed on the screen display unit 820, the content, and the input label, and stores it in the storage unit 840 (step S804). Then, the teacher data generation unit 853 checks whether or not there is any content not having been displayed to the user in the storage unit 840 (step S805). If there remains any non-displayed content, the teacher data generation unit 853 returns to the processing of step S801 and repeats the same processing as the above-described processing. On the other hand, if there remains no non-displayed content, the teacher data generation unit 853 ends the teacher data generation processing.

In this way, according to the input mode by means of a gesture operation, teacher data can be created without any limitation on the place. This is because a user is able to input a label representing the category to which the content belongs by an operation of a gesture which does not cause any sound when inputting.

Other Exemplary Embodiments

While the present invention has been described using some exemplary embodiments, the present invention is not limited to the exemplary embodiments described above, and other various additions and changes can be made. For example, in the above description, processing of displaying content data such as a frame image serving as the source of generating teacher data on a screen display unit, processing of accepting an input of a label from a user by a flick or the like, processing of performing machine learning, and processing of performing automatic classification using a classification model, are performed by the same arithmetic processing unit. However, these kinds of processing may be performed by being shared by a plurality of different arithmetic processing units.

INDUSTRIAL APPLICABILITY

The present invention is applicable to creation of teacher data in the fields of video monitoring, video analysis, and the like.

The whole or part of the exemplary embodiments disclosed above can be described as, but not limited to, the following supplementary notes.

(Supplementary Note 1)
A data processing device comprising:
a display unit;
a touch panel unit that detects a touch operation and outputs detection information;
a flick detection unit that detects a direction of a flick from the detection information of the touch panel unit;
a label determination unit that determines a label representing a category to which content belongs, according to the direction of the flick; and
a teacher data generation unit that displays the content on the display unit, and generates teacher data including the displayed content and the label determined by the label determination unit.

(Supplementary Note 2)
The data processing device according to supplementary note 1, wherein
the flick detection unit detects a direction and a speed of a flick from the detection information of the touch panel unit,
the label determination unit determines the label representing the category to which the content belongs and a certainty factor of the label, according to the direction and the speed of the flick, and
the teacher data generation unit generates the teacher data including the displayed content and the label and the certainty factor determined by the label determination unit.

(Supplementary Note 3)
The data processing device according to supplementary note 2, wherein
the label determination unit determines the certainty factor to be higher as the speed of the flick is higher.

(Supplementary Note 4)
The data processing device according to supplementary note 1, wherein
the label determination unit determines the label representing the category to which the content belongs and a certainty factor of the label, according to the direction of the flick, and
the teacher data generation unit generates the teacher data including the displayed content and the label and the certainty factor determined by the label determination unit.

(Supplementary Note 5)
The data processing device according to any of supplementary notes 1 to 4, further comprising
a machine learning unit that generates a classification model with use of the teacher data; and
a classification unit that determines a category to which classification target content belongs, using the classification model.

(Supplementary Note 6)
A data processing unit comprising:
a display unit;
an acceleration sensor unit that detects a shake and outputs detection information;
a shake direction detection unit that detects a direction of the shake from the detection information of the acceleration sensor unit;
a label determination unit that determines a label representing a category to which content belongs, according to the direction of the shake; and
a teacher data generation unit that displays the content on the display unit, and generates teacher data including the displayed content and the label determined by the label determination unit.

(Supplementary Note 7)
A data processing device comprising:
a display unit;
a tilt sensor unit that detects a tilt and outputs detection information;
a tilt direction detection unit that detects a direction of the tilt from the detection information of the tilt sensor unit;
a label determination unit that determines a label representing a category to which content belongs, according to the direction of the tilt; and
a teacher data generation unit that displays the content on the display unit, and generates teacher data including the displayed content and the label determined by the label determination unit.

(Supplementary Note 8)
A data processing unit comprising:
a display unit;
touch panel unit that detects a touch operation and outputs detection information;
a gesture detection unit that detects a type of a gesture from the detection information of the touch panel unit;
a label determination unit that determines a label representing a category to which content belongs, according to the type of the gesture; and
a teacher data generation unit that displays the content on the display unit, and generates teacher data including the displayed content and the label determined by the label determination unit.

(Supplementary Note 9)
A data processing method performed by a data processing device including a display unit and a touch panel unit that detects a touch operation and outputs detection information, the method comprising:
displaying content on the display unit;
detecting a direction of a flick from the detection information of the touch panel unit;
determining a label representing a category to which the content belongs, according to the direction of the flick; and
generating teacher data including the content and the label.

(Supplementary Note 10)
The data processing method according to supplementary note 9, wherein
the detecting the flick includes detecting a direction and a speed of the flick from the detection information of the touch panel unit,
the determining the label includes determining the label representing the category to which the content belongs and a certainty factor of the label, according to the direction and the speed of the flick, and
the generating the teacher data includes generating the teacher data including the content, the label, and the certainty factor.

(Supplementary Note 11)
The data processing method according to supplementary note 10, wherein
the determining the label includes determining the certainty factor to be higher as the speed of the flick is higher.

(Supplementary Note 12)
The data processing method according to supplementary note 9, wherein
the determining the label includes determining the label representing the category to which the content belongs and a certainty factor of the label, according to the direction of the flick, and the generating the teacher data includes generating the teacher data including the content, the label, and the certainty factor.

(Supplementary Note 13)

The data processing method according to any of supplementary notes 9 to 12, further comprising generating a classification model with use of the teacher data; and determining a category to which classification target content belongs, using the classification model.

(Supplementary Note 14)

A data processing method performed by a data processing device including a display unit and an acceleration sensor unit that detects a shake and outputs detection information, the method comprising:

displaying content on the display unit detecting a direction of the shake from the detection information of the acceleration sensor unit;

determining a label representing a category to which the content belongs, according to the direction of the shake; and generating teacher data including the content and the label.

(Supplementary Note 15)

A data processing method performed by a data processing device including a display unit and a tilt sensor unit that detects a tilt and outputs detection information, the method comprising:

displaying content on the display unit detecting a direction of the tilt from the detection information of the tilt sensor unit;

determining a label representing a category to which the content belongs, according to the direction of the tilt; and generating teacher data including the content and the label.

(Supplementary Note 16)

A data processing method performed by a data processing device including a display unit and a touch panel unit that detects a touch operation and outputs detection information, the method comprising:

displaying content on the display unit;

detecting a type of a gesture from the detection information of the touch panel unit;

determining a label representing a category to which the content belongs, according to the type of the gesture; and generating teacher data including the content and the label.

(Supplementary Note 17)

A program for causing a computer, including a display unit and a touch panel unit that detects a touch operation and outputs detection information, to function as:

a flick detection unit that detects a direction of a flick from the detection information of the touch panel unit;

a label determination unit that determines a label representing a category to which content belongs, according to the direction of the flick; and a teacher data generation unit that displays the content on the display unit, and generates teacher data including the displayed content and the label determined by the label determination unit.

(Supplementary Note 18)

A program for causing a computer, including a display unit and an acceleration sensor unit that detects a shake and outputs detection information, to function as:

a shake direction detection unit that detects a direction of the shake from the detection information of the acceleration sensor unit;

a label determination unit that determines a label representing a category to which content belongs, according to the direction of the shake; and a teacher data generation unit that displays the content on the display unit, and generates teacher data including the displayed content and the label determined by the label determination unit.

(Supplementary Note 19)

A program for causing a computer, including a display unit and a tilt sensor unit that detects a tilt and outputs detection information, to function as:

a tilt direction detection unit that detects a direction of the tilt from the detection information of the tilt sensor unit;

a label determination unit that determines a label representing a category to which content belongs, according to the direction of the tilt; and a teacher data generation unit that displays the content on the display unit, and generates teacher data including the displayed content and the label determined by the label determination unit.

(Supplementary Note 20)

A program for causing a computer, including a display unit and a touch panel unit that detects a touch operation and outputs detection information, to function as:

a gesture detection unit that detects a type of a gesture from the detection information of the touch panel unit;

a label determination unit that determines a label representing a category to which content belongs, according to the type of the gesture; and a teacher data generation unit that displays the content on the display unit, and generates teacher data including the displayed content and the label determined by the label determination unit.

The invention claimed is:

1. A data processing device comprising:
a display unit;
a touch panel unit configured to detect a touch operation and output detection information; and
at least one processor configured to implement:
a flick detection unit configured to detect a direction of a flick from the detection information of the touch panel unit;
a label determination unit configured to determine a label representing a category to which content belongs, based on the direction of the flick; and
a teacher data generation unit configured to display the content on the display unit, and generate teacher data including the content and the label determined by the label determination unit,
wherein the flick detection unit is further configured to detect the direction and a speed of a flick from the detection information of the touch panel unit,
the label determination unit is further configured to determine the label representing the category to which the content belongs and a certainty factor of the label, based on the direction and the speed of the flick, and
the teacher data generation unit is further configured to generate the teacher data including the displayed content and the label and the certainty factor determined by the label determination unit.

2. The data processing device according to claim 1, wherein
the label determination unit is further configured to determine the certainty factor to be higher as the speed of the flick is higher.

3. The data processing device according to claim 1, further comprising:

a first correspondence table showing a relationship between a direction of a flick and the label; and a second correspondence table showing a relationship between a speed of a flick and the certainty factor, wherein the label determination unit is further configured to determine the label with reference to the first correspondence table, and determine the certainty factor with reference to the second correspondence table.

4. A data processing method performed by a data processing device including a display unit and a touch panel unit configured to detect a touch operation and output detection information, the method comprising:

displaying content on the display unit;

detecting a direction of a flick from the detection information of the touch panel unit;

determining a label representing a category to which the content belongs, based on the direction of the flick; and generating teacher data including the content and the label, wherein the detecting the flick includes detecting the direction and a speed of the flick from the detection information of the touch panel unit, the determining the label includes determining the label representing the category to which the content belongs and a certainty factor of the label, based on the direction and the speed of the flick, and the generating the teacher data includes generating the teacher data including the content, the label, and the certainty factor.

5. The data processing method according to claim 4, wherein the determining the label includes determining the certainty factor to be higher as the speed of the flick is higher.

6. The data processing method according to claim 4, wherein the determining the label and the certainty factor of the label includes determining the label with reference to a first correspondence table showing a relationship between a direction of a flick and the label, and determining the certainty factor with reference to a second correspondence table showing a relationship between a speed of a flick and the certainty factor.

7. A non-transitory computer readable medium storing a program comprising instructions for causing a computer to function as, the computer including a display unit and a touch panel unit configured to detect a touch operation and output detection information:

a flick detection unit configured to detect a direction of a flick from the detection information of the touch panel unit;

a label determination unit configured to determine a label representing a category to which content belongs, based on the direction of the flick; and a teacher data generation unit configured to display the content on the display unit, and generate teacher data including the content and the label determined by the label determination unit, wherein the flick detection unit is further configured to detect the direction and a speed of a flick from the detection information of the touch panel unit, the label determination unit is further configured to determine the label representing the category to which the content belongs and a certainty factor of the label, based on the direction and the speed of the flick, and the teacher data generation unit is further configured to generate the teacher data including the displayed content and the label and the certainty factor determined by the label determination unit.

* * * * *